US010599911B2

(12) United States Patent
Ryshtun et al.

(10) Patent No.: US 10,599,911 B2
(45) Date of Patent: Mar. 24, 2020

(54) ANTI-SPOOFING PROTECTION FOR FINGERPRINT CONTROLLERS

(71) Applicant: Cypress Semiconductor Corporation, San Jose, CA (US)

(72) Inventors: Andriy Ryshtun, Lviv (UA); Viktor Kremin, Lviv (UA); Oleksandr Rohozin, Lviv (UA); Oleksandr Pirogov, Lviv (UA); Mykhaylo Krekhovetskyy, Lviv (UA); Volodymyr Bihday, Lviv (UA); Roman Ogirko, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/466,670

(22) Filed: Mar. 22, 2017

(65) Prior Publication Data
US 2018/0025202 A1    Jan. 25, 2018

Related U.S. Application Data

(60) Provisional application No. 62/420,327, filed on Nov. 10, 2016, provisional application No. 62/419,769, (Continued)

(51) Int. Cl.
*G06K 9/00* (2006.01)

(52) U.S. Cl.
CPC ......... *G06K 9/0012* (2013.01); *G06K 9/0002* (2013.01); *G06K 9/00087* (2013.01); *G06K 9/00114* (2013.01); *G06K 9/00899* (2013.01)

(58) Field of Classification Search
CPC ............ G06K 9/0012; G06K 9/00013; G06K 9/0002; G06K 9/00906; G06K 9/00114;
(Continued)

(56) References Cited

U.S. PATENT DOCUMENTS 3,928,842 A    12/1975   Green et al.
5,926,555 A     7/1999   Ort et al.
(Continued)

FOREIGN PATENT DOCUMENTS

CN    103324944 A    9/2013
KR    101055603 B1   8/2011

OTHER PUBLICATIONS

Antonelli et al., Fake Finger Detection by Skin Distortion Analysis, Aug. 14, 2006 [retrieved Oct. 16, 2017], IEEE Transactions on Information Forensics and Security, vol. 1, Issue: 3,pp. 360-373. Retrieved from the Internet: http://ieeexplore.ieee.org/document/1673397/#full-text-section.*
(Continued)

*Primary Examiner* — Andrew M Moyer
*Assistant Examiner* — Dennis Rosario

(57) ABSTRACT

A method for detecting fingerprint spoof objects includes detecting a presence of the object at a fingerprint sensor and, in response to detecting the presence of the object, measuring a set of physical properties of the object based on one or more signals from a set of electrodes of the fingerprint sensor. The set of physical properties includes at least one of a subdermal compliance of the object and a surface adhesiveness of the object. The method further includes distinguishing the object as an actual finger or a spoof based on the one or more physical properties.

18 Claims, 19 Drawing Sheets

Related U.S. Application Data filed on Nov. 9, 2016, provisional application No. 62/364,684, filed on Jul. 20, 2016.

(58) Field of Classification Search
CPC .......... G06K 9/00107; G06K 9/00899; G06K 9/00026; G06K 7/10722; G06K 9/00006; G06K 9/00067; G06K 9/0004; G06K 9/00033; G06K 9/00073; G06K 9/0008; G06K 2009/00932; G06K 9/00053; G06K 2009/0006; G06K 9/00885; G06K 9/00; G06K 9/00201; A61B 5/6826; A61B 5/1172; G06F 21/32; G06F 3/04883; G06F 3/044; G06F 3/0416
See application file for complete search history.

(56) References Cited

U.S. PATENT DOCUMENTS

| | | | |
|---|---|---|---|
| 5,953,441 A | 9/1999 | Setlak | |
| 6,011,860 A * | 1/2000 | Fujieda | A61B 5/1172 382/124 |
| 6,292,576 B1 * | 9/2001 | Brownlee | G06K 9/00006 340/5.83 |
| 6,466,686 B2 * | 10/2002 | Senior | G06K 9/00067 382/124 |
| 7,072,523 B2 | 7/2006 | Bolle et al. | |
| 7,146,029 B2 * | 12/2006 | Manansala | G06K 9/00026 382/115 |
| 7,200,250 B2 * | 4/2007 | Chou | G06K 9/00026 382/124 |
| 7,480,397 B2 * | 1/2009 | Ide | A61B 5/1172 382/115 |
| 7,505,613 B2 * | 3/2009 | Russo | G06K 9/00114 340/5.53 |
| 7,545,621 B2 * | 6/2009 | Haddad | G06K 9/00053 361/220 |
| 7,804,984 B2 | 9/2010 | Sidlauskas et al. | |
| 7,809,168 B2 * | 10/2010 | Abiko | G06F 3/03547 382/115 |
| 7,831,010 B2 | 11/2010 | Tobita | |
| 7,831,070 B1 * | 11/2010 | Cheng | G06K 9/00013 382/124 |
| 8,090,163 B2 | 1/2012 | Schuckers et al. | |
| 8,275,178 B2 | 9/2012 | Boshra | |
| 8,958,607 B2 * | 2/2015 | Juveneton | G06K 9/00906 382/115 |
| 9,104,901 B2 | 8/2015 | Minteer et al. | |
| 9,251,329 B2 * | 2/2016 | Lien | G06F 21/32 |
| 9,400,911 B2 | 7/2016 | Erhart et al. | |
| 9,471,764 B2 | 10/2016 | Coons | |
| 9,471,827 B2 * | 10/2016 | Thiebot | G06K 9/00013 |
| 9,582,705 B2 | 2/2017 | Du et al. | |
| 9,639,765 B2 | 5/2017 | Du et al. | |
| 9,652,696 B2 * | 5/2017 | Won | G01L 1/247 |
| 9,665,763 B2 | 5/2017 | Du et al. | |
| 9,760,753 B2 * | 9/2017 | Bechtel | G06K 9/0002 |
| 9,767,358 B2 | 9/2017 | Xue et al. | |
| 2003/0123714 A1 * | 7/2003 | O'Gorman | G06K 9/00026 382/124 |
| 2006/0034493 A1 * | 2/2006 | Shimamura | A61B 5/1172 382/115 |
| 2008/0166028 A1 * | 7/2008 | Turek | G06K 9/0002 382/124 |
| 2010/0066697 A1 * | 3/2010 | Jacomet | G06F 3/0414 345/173 |
| 2014/0201126 A1 | 7/2014 | Zadeh et al. | |
| 2014/0337930 A1 | 11/2014 | Hoyos et al. | |
| 2016/0063294 A1 | 3/2016 | Du et al. | |
| 2016/0117544 A1 | 4/2016 | Hoyos et al. | |
| 2016/0140380 A1 | 5/2016 | Carver et al. | |
| 2016/0148034 A1 | 5/2016 | Kremin et al. | |
| 2016/0335483 A1 | 11/2016 | Pfursich et al. | |
| 2016/0350573 A1 * | 12/2016 | Kitchens, II | G06K 9/0002 |
| 2017/0124374 A1 * | 5/2017 | Rowe | G06K 9/0012 |
| 2018/0089484 A1 | 3/2018 | Satou et al. | |
| 2018/0173936 A1 | 6/2018 | Mizoguchi | |

OTHER PUBLICATIONS

International Search Report for International Application No. PCT/US17/38156 dated Jul. 18, 2017; 5 pages.

Written Opinion of the International Searching Authority for International Application No. PCT/US17/38156 dated Jul. 18, 2017; 8 pages.

Arunalatha G. "Spoof Detection of Fingerprint Biometrics based on Local and Global Quality Measures," International Journal of Computer Applications, vol. 124, No. 16, Aug. 2015, pp. 22-25; 4 pages.

Arunalatha G., "Fingerprint Spoof Detection Using Quality Features," International Journal of Security and Its Applications, vol. 9, No. 10, 2015, pp. 83-94; 12 pages.

Kristin Nixon, "Multispectral Fingerprint Imaging for Spoof Detection," SPIE, vol. 5779, Jun. 2, 2015, pp. 214-225; 12 pages.

Samruddhi Kulkarni, "Survey on Fingerprint Spoofing, Detection Techniques and Databases" International Journal of Computer Applications, 2015, pp. 30-33; 4 pages.

Shoude Chang, "Fingerprint Spoof Detection Using Near Infrared Optical Analysis," INTECH, Jul. 2011, pp. 57-85; 30 pages.

USPTO Non-Final Rejection for U.S. Appl. No. 15/713,346 dated Dec. 8, 2017; 10 pages.

USPTO Non-Final Rejection for U.S. Appl. No. 15/713,346 dated Jun. 18, 2018; 9 pages.

USPTO Notice of Allowance for U.S. Appl. No. 15/713,346 dated Mar. 6, 2019; 9 pages.

USPTO Notice of Allowance for U.S. Appl. No. 15/713,346 dated Oct. 31, 2018; 9 pages.

USPTO Notice of Allowance for U.S. Appl. No. 15/713,346 dated Jun. 12, 2019; 9 pages.

USPTO Notice of Allowability for U.S. Appl. No. 15/713,346 dated Aug. 7, 2019; 5 pages.

USPTO Notice of Allowability for U.S. Appl. No. 15/713,346 dated Sep. 27, 2019; 9 pages.

* cited by examiner

ANTI-SPOOFING PROTECTION FOR FINGERPRINT CONTROLLERS

RELATED APPLICATIONS

This application claims priority to U.S. Provisional Application No. 62/420,327, filed on Nov. 10, 2016, to U.S. Provisional Application No. 62/419,769, filed on Nov. 9, 2016, and to U.S. Provisional Application No. 62/364,684, filed on Jul. 20, 2016, all of which are incorporated by reference herein in their entirety.

TECHNICAL FIELD

This disclosure relates to the field of fingerprint sensors and, in particular, to spoof detection techniques for fingerprint sensors.

BACKGROUND

Capacitance sensing systems function by sensing electrical signals generated on electrodes that reflect changes in capacitance. Such changes in capacitance can indicate a touch event or the presence of ridges and valleys of a fingerprint. Fingerprint sensing may be used for security and validation applications for a variety of user interface devices, such as mobile handsets, personal computers, and tablets. The use of capacitance sensing for fingerprint detection may allow for a sensor to be placed in the surface of a user interface device with a great degree of configurability. That is, a sensor is not constrained to a single location for all devices. Rather, a fingerprint sensor may be disposed in a location on the device that is convenient for a particular industrial design, or to optimize a user's experience.

Capacitance-based fingerprint sensors function by measuring the capacitance of a capacitive sense element, such as a sensor electrode, and detecting a change in capacitance indicating a presence or absence of a fingerprint ridge (or valley). Ridges and valleys at identifiable locations on an array of sense elements may be used to reconstruct the image of the fingerprint for use in enrollment, validation, and security applications. When a fingerprint ridge comes into contact with a sense element, the capacitance change caused by the fingerprint ridge is detected. The capacitance change of the sense elements can be measured by an electrical circuit that converts the capacitances measured from the capacitive sense elements into digital values.

BRIEF DESCRIPTION OF THE DRAWINGS

The present disclosure is illustrated by way of example, and not by way of limitation, in the figures of the accompanying drawings.

DETAILED DESCRIPTION

Figure 1:
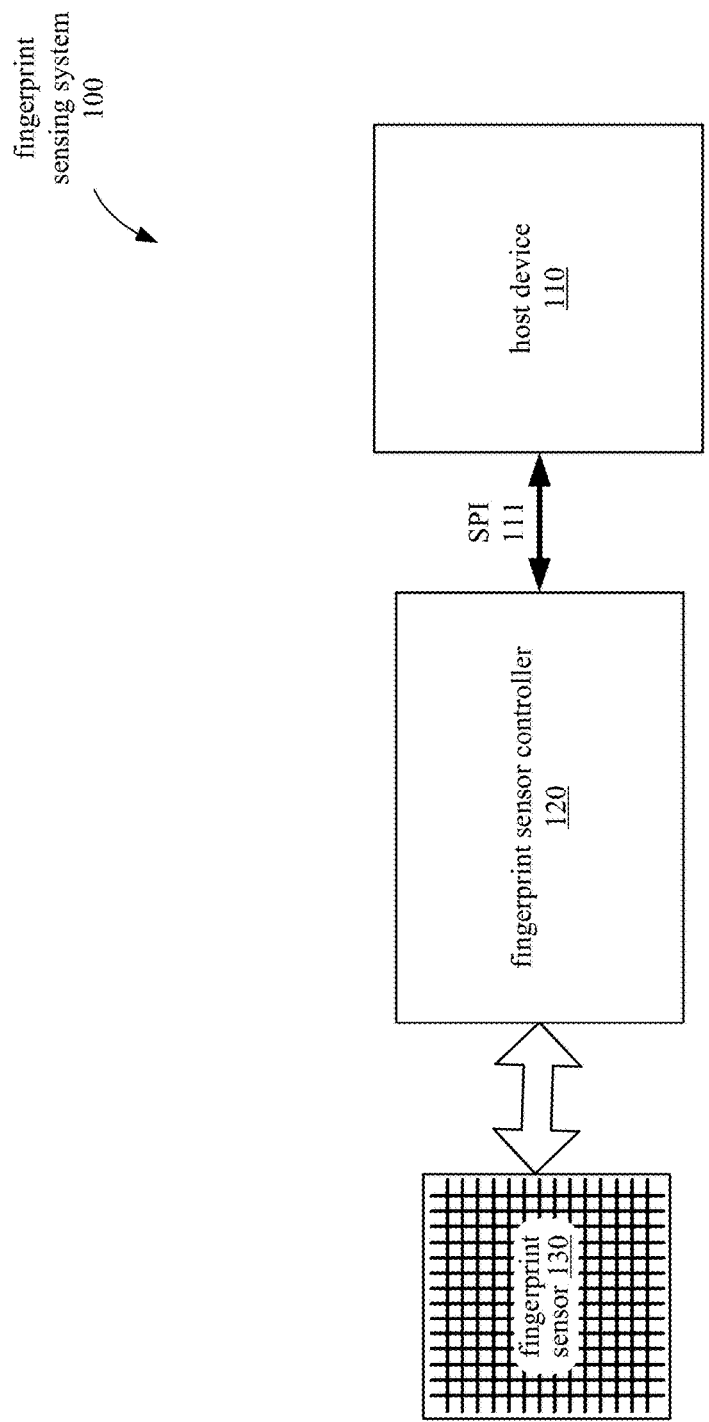
FIG. 1 is a block diagram illustrating an embodiment of a fingerprint sensing system.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the spirit and scope of the claimed subject matter.

One technique for illicitly gaining access to a system that is secured by a fingerprint authentication scheme is spoofing. A spoof is an artificial object that imitates a real human finger. In particular, the spoof replicates a fingerprint pattern of a user who is authorized to access the secured system, and can be placed on a fingerprint sensor in order to deceive the secured system into granting access. Fingerprint spoofs can be made from fingerprints left by the targeted authorized user; for example, the fingerprints can be collected from a surface without the cooperation of the targeted user. Spoofs can be created using a variety of techniques and materials, including but not limited to casts (e.g., gelatin, glycerin suppository, wood glue, graphite spray, latex, and silicon) and molds (e.g., laser printed transparencies, printed circuit boards (PCBs), laser etched, acrylic, Play-Doh™, moldable plastic, and silicon). In order to prevent spoofing attacks, a fingerprint sensing system should pass real human fingerprints to matching or enrollment algorithms while rejecting spoof objects to prevent the spoofs from being matched with fingerprint data of authorized users or enrolled as real fingerprints.

One embodiment of a fingerprint sensing system prevents fingerprint spoofing attacks by measuring one or more mechanical or electrical properties of fingers or spoof objects placed on the fingerprint sensor. The mechanical or electrical properties can then be used to distinguish between actual fingers and spoof objects. In one embodiment, the fingerprint sensing system implements a multi-factor scoring system that generates a spoof detection result based on a sum of weighted factors each corresponding to one of a number of measurable mechanical or electrical properties.

One mechanical property that can be used to distinguish an actual finger from a spoof object is the subdermal compliance. A human finger has a rigid external skin surface that carries the features of the fingerprint (e.g., arches, loops, whorls, etc.) and that is supported underneath by soft elastic tissue and rigid bone. The subdermal compliance is the degree of elasticity of the soft tissue under the skin. Since this property is difficult to replicate in a spoof object, the subdermal compliance can be measured and used to distinguish between real fingers and spoof objects.

In some embodiments, the subdermal compliance property can be measured by observing the ability of a purported finger to uniformly cover the sensing area of a fingerprint sensor that is recessed or bounded by raised edges. In one example embodiment, the fingerprint sensor is bounded by an electrostatic discharge (ESD) guard ring that is raised relative to the sensing surface of the fingerprint sensor. Since spoof objects typically do not have the same subdermal compliance properties as a real finger, it is difficult to apply a spoof object to a recessed fingerprint sensor to achieve the full and uniform coverage of the sensing surface that can be readily achieved by a finger. The coverage of the sensing surface can be determined from a change in contrast across the image captured by the fingerprint sensor. Thus, contrast differences between different areas of the image can be used to differentiate between fingers and spoofs.

In one embodiment, the subdermal compliance of an object can also be measured by a fingerprint sensor that is located on a mechanical button. The mechanical button facilitates capturing images of the surface of the purported finger at different levels of applied force, with images being captured prior to and during a button press. The contrast change between these images corresponds to the subdermal compliance property of the object, and can thus be used to distinguish between fingers and spoofs.

In one embodiment, the dynamic range of the contrast for an image captured during a button press is used to distinguish between fingers and spoof objects. For an actual finger, the maximum image contrast detected over the course of a button press is typically higher than for a spoof object, particularly for non-elastic spoofs. Some spoof materials, such as polyvinyl alcohol (PVA), exhibit a negative contrast change in response to increasing applied force and can be distinguished accordingly.

One embodiment of a fingerprint sensing system distinguishes between real fingers and spoof objects based on surface adhesiveness. Such a system employs a force sensor to measure the force applied by the object to the fingerprint sensor while simultaneously measuring the contrast change. The surface adhesiveness of a finger results in no decrease in contrast after a decrease in applied force due to adhesion of the skin surface to the fingerprint sensor. The system can thus distinguish fingers from spoof objects that do not exhibit this property.

In one embodiment, the fingerprint sensing system determines whether an object is a finger or a spoof by measuring the complex conductivity of the object. In particular, the system tests the object's ability to couple signals between different sets of electrodes. The system drives a first set of electrodes with a transmit (TX) signal and a second set of electrodes with an antiphase version of the TX signal. The TX and antiphase TX signals are coupled to a receive (RX) listener electrode via dissimilar signal paths.

Spoof materials having low conductivity (e.g., silicone, wood glue, plastic, etc.) are rejected by small TX-RX coupling by the object. Highly conductive spoof materials (e.g., etched or laser-cut printed circuit boards, flexible printed circuits (FPCs), metal foil, etc.) are rejected based on a small resulting amplitude of the TX-RX coupling, since the positive TX signal is compensated by the antiphase TX signal through coupling by the object.

In one embodiment, the fingerprint sensing system calculates a factor score for each of the measured mechanical and electrical properties, where the factor score indicates the likelihood that the object is an actual finger, as evaluated based on the corresponding property. The system further calculates an overall authenticity score based on a sum of the weighted factor scores. The authenticity score can be compared to a threshold to determine whether the object is ultimately distinguished as a finger or a spoof.

FIG. 1 illustrates an embodiment of a fingerprint sensing system 100 which distinguishes fingers from spoof objects based on measured physical and electrical properties. The fingerprint sensing system 100 includes a host device 110 coupled to a fingerprint sensor controller 120 via a serial peripheral interface (SPI) 111. The fingerprint sensor controller is coupled to a fingerprint sensor 130. The fingerprint sensor 130 includes an array of capacitive sensor electrodes for imaging the surface of an object placed on the sensing surface of the fingerprint sensor 130.

Among other functions, the fingerprint sensor controller 120 transmits and receives signals to and from the fingerprint sensor 130 in order to acquire an image of the surface pattern of an object (e.g., a fingerprint of a user's finger) on the fingerprint sensor 130. The fingerprint sensor controller 120 can then securely transmit the acquired image to the host device 110 via SPI 111 to initiate authentication of the user in the host device 110. The host device 110 authenticates the user based on matching the acquired image with fingerprint data associated with the user in a database. Upon authenticating the user, the host device 110 grants access to a resource; for example, the host device 110 may be a mobile device, such as a phone or laptop computer that unlocks and grants access to a user interface or filesystem in response to a successful authentication.

The fingerprint sensor controller 120 also provides spoof detection functionality. In one embodiment, the fingerprint sensor controller 120 distinguishes an object on the fingerprint sensor 130 as a finger or as a spoof object based on measured physical or electrical properties of the object, then transmits an image of the surface pattern of the object only when the object is distinguished as a finger. In an alternative configuration, the fingerprint sensor controller 120 transmits the physical or electrical property measurements or factor scores based on the measurements to the host device 110 so the host device 110 can perform the spoof detection calculations in addition to the fingerprint image matching.

Figure 2:
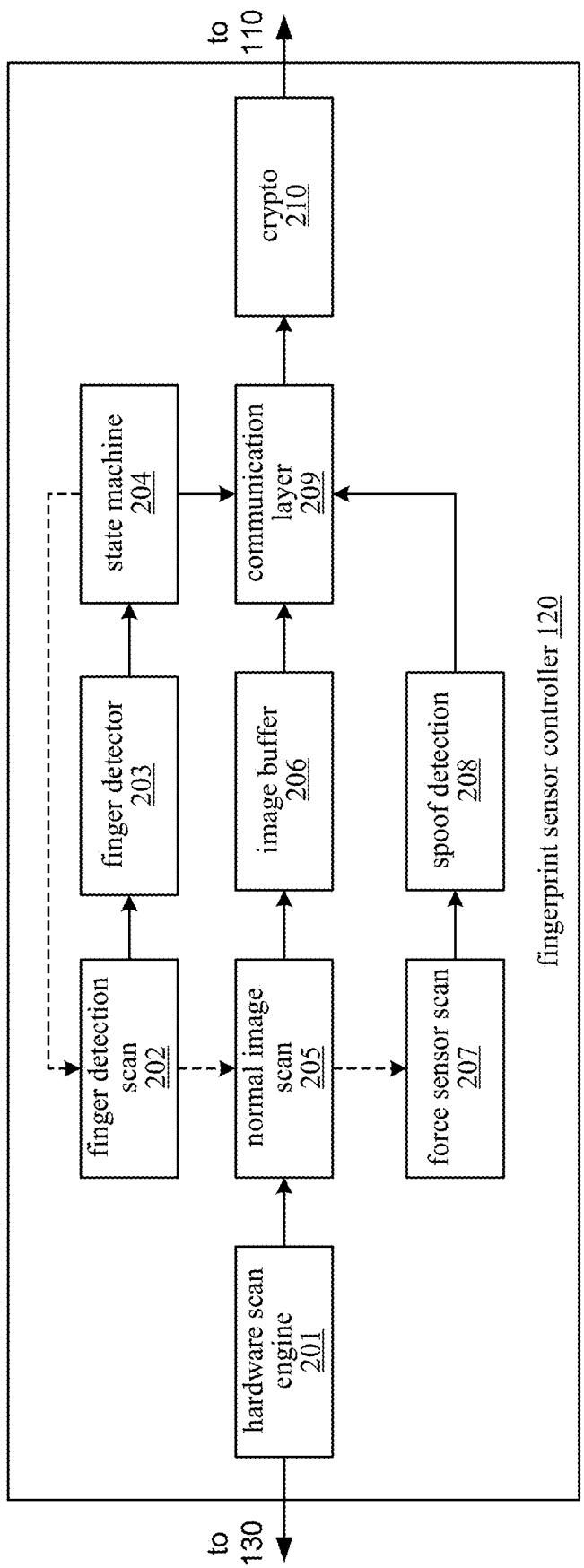
FIG. 2 is a block diagram illustrating an embodiment of a fingerprint sensor controller.

FIG. 2 illustrates the fingerprint sensing circuitry in the controller 120, according to an embodiment. The fingerprint sensor controller 120 includes several circuit modules and logic components that facilitate functions such as fingerprint imaging, finger presence detection, spoof detection, and communication with the host device 110.

One of these modules is the hardware scan engine 201, which includes multiple sensing channels that can be connected to the electrodes of the fingerprint sensor 130. The sensing channels perform mutual capacitance or self-capacitance sensing using the electrodes in order to acquire fingerprint images from the fingerprint sensor 130. In one embodiment, the capacitance values may be measured as count values, with increasing count values corresponding to increasing capacitances. A high count value for a pixel in the fingerprint image thus indicates the presence of a conductive feature of the fingerprint, such as a ridge.

The state machine 204 defines the sequence in which other modules in the fingerprint sensor controller 120 are activated. Transitions between states as defined by the state machine 204 may be initiated by inputs from other modules, such as finger detector 203, spoof detection 208, etc.

The finger detection scan module 202 invokes the hardware scan engine 201 to detect the presence of a finger or other object at the fingerprint sensor 130. The finger detector 203 processes capacitance data acquired by the scan engine 201 to determine whether an object is present at the fingerprint sensor 130.

In response to detecting the presence of a finger or other object at the fingerprint sensor 130, the normal image scan module 205 invokes the hardware scan engine 201 to perform a normal full scan of the fingerprint sensor 130 to acquire an image of the surface pattern of the finger or other object. The acquired image is stored in the image buffer 206.

The spoof detection logic 208 performs anti-spoofing calculations based on image data acquired from the fingerprint sensor 130 and sensor data from other sources, such as a force sensor (via force sensor scan module 207) in order to determine whether an object at the fingerprint sensor 130 is a real finger or a spoof. In one embodiment, the spoof detection logic 208 operates in response to the finger detector 203 detecting the presence of a finger or other object on the fingerprint sensor 130.

Upon receiving notification that an object is present at the sensor 130, the spoof detection logic 208 determines whether the object is a finger or a spoof object by initiating the measurement of a set of physical or electrical properties of the object. The physical and electrical properties of the object are measured based on signals from the electrodes of the fingerprint sensor and from other sensors, such as a force sensor. In one embodiment, the set of physical properties includes the subdermal compliance of the object and/or a surface adhesiveness of the object. The spoof detection logic 208 generates a spoof detection result by distinguishing the object as an actual finger or a spoof based on the measured set of physical properties.

In one embodiment, the spoof detection logic 208 calculates an authenticity score based on a sum of weighted factors each corresponding to one of the physical properties. The spoof detection logic 208 then distinguishes the object as an actual finger in response to the authenticity score exceeding a predetermined threshold, or distinguishes the object as a spoof in response to the authenticity score failing to exceed the predetermined threshold.

In one embodiment, when the spoof detection logic 208 distinguishes the object as an actual finger, the fingerprint image is transmitted to the host device 110. The fingerprint image from the image buffer 206 is prepared for transmission by communication layer 209 and encrypted by the cryptography module 210 prior to being transmitted in encrypted form over SPI 111 to the host device 110.

In one embodiment, when the object is detected as a spoof, the spoof detection logic 208 notifies the host device 110 that a spoof has been attempted. In an alternative configuration, the spoof detection logic 208 transmits surface pattern images or other measures of the physical or electrical properties of the object to the host device 110 so that the host device 110 can perform the calculations for distinguishing the object as a finger or a spoof.

In addition to the above-described functions, embodiments of the fingerprint sensor controller 120 also include additional circuit modules and logic (omitted for clarity) for performing such functions as low-power finger detection, false finger filtering, navigation (i.e., reporting of finger movement), touch pressure detection, tap gesture recognition, built-in manufacturing and self-tests, and firmware upgrades.

Figure 3A:
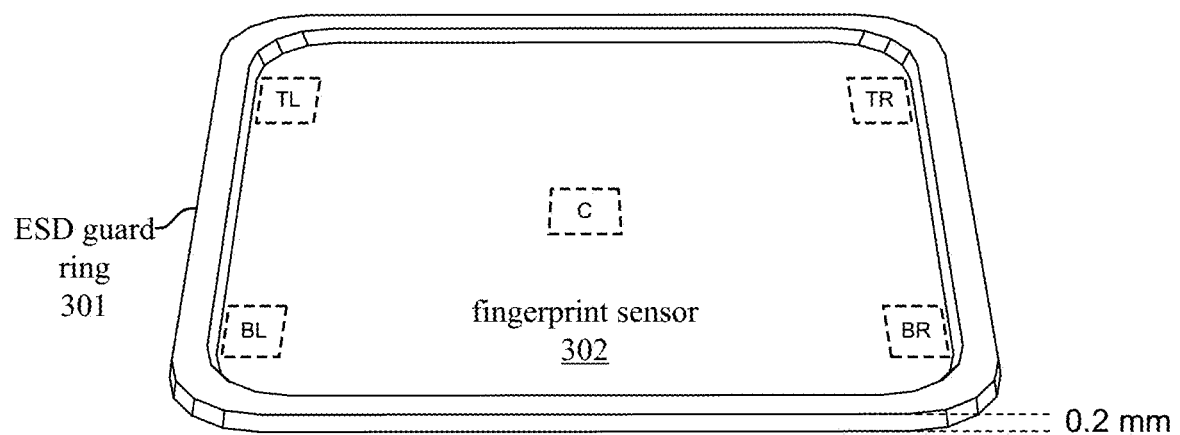
FIG. 3A illustrates an embodiment of a fingerprint sensor with an electrostatic discharge (ESD) guard ring.
Figure 3B:
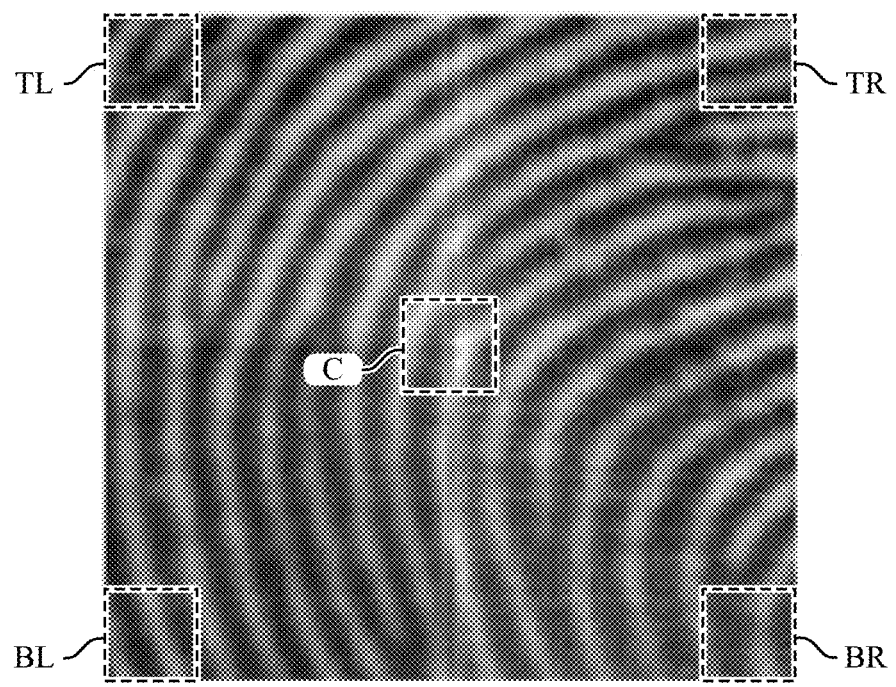
FIG. 3B illustrates subareas of a fingerprint image, according to an embodiment.

FIG. 3A illustrates a fingerprint sensor 302 that is surrounded by a raised ESD guard ring 301, according to an embodiment. The fingerprint sensor 302 with ESD guard ring 301 is used to measure the subdermal compliance of a finger or other object on the fingerprint sensor 302 by performing an area coverage test. For this test, the fingerprint sensor 302 captures an image of the surface pattern of the finger or other object; then, a mean intensity value (or other calculated intensity value) is determined for each of a set of five small subareas of the image: top left (TL), top right (TR), bottom left (BL), bottom right (BR), and center (C). FIG. 3B illustrates the locations of subareas TL, TR, BL, BR, and C on a fingerprint pattern of an actual finger. For a real finger, the mean intensity values for these areas are substantially similar. For a spoof object, the mean values differ from each other by a greater amount, and/or have a smaller magnitude overall. In alternative embodiments, areas of the sensor other than the illustrated TL, TR, BL, BR, and C areas can be used for the calculation.

As illustrated in FIG. 3A, the raised ESD guard ring 301 surrounds the fingerprint sensor 302, thus creating a recess in which the fingerprint sensor 302 is located. In one embodiment, the height of the ESD guard ring 301 is 0.2 millimeters above the surface of the sensor 302. The raised edges of the ESD guard ring 301 make it difficult to place a flat rigid object, such as a spoof, on the fingerprint sensor 302 so that the sensing surface of the sensor 302. As a result, the surface of a rigid spoof object placed on the sensor 302 does not uniformly contact all portions of the sensing surface. In particular, the surface of the spoof object contacts the fingerprint sensor 302 surface with a greater applied force at the center area C than at the corner areas TL, TR, BL, and BR because the force applied at the corners is partially borne by the raised edges of the ESD guard ring 301.

As a result, the mean intensity values from each of the corner areas TL, TR, BL, and BR can be compared to the mean intensity value from the center area C to distinguish a finger from a spoof. In one embodiment, the size of each of the areas TL, TR, BL, BR, and C is 10×10 pixels, where each pixel represents a sensor element of the fingerprint sensor (e.g., such as an intersection of a RX electrode and a TX electrode) for which a discrete count can be determined. For each subarea, the mean intensity value is calculated by averaging the intensity values of the 100 pixels in the subarea. In one embodiment, the object is distinguished as a real finger if all five of the mean intensity values are within a certain number of counts of each other. In addition, the absolute value of the mean intensity for the entire image can be checked in order to detect spoof materials having low conductivity. By this method, an object would be rejected as a spoof if the absolute value of the mean intensity over the entire image is less than a threshold intensity value.

Figure 4:
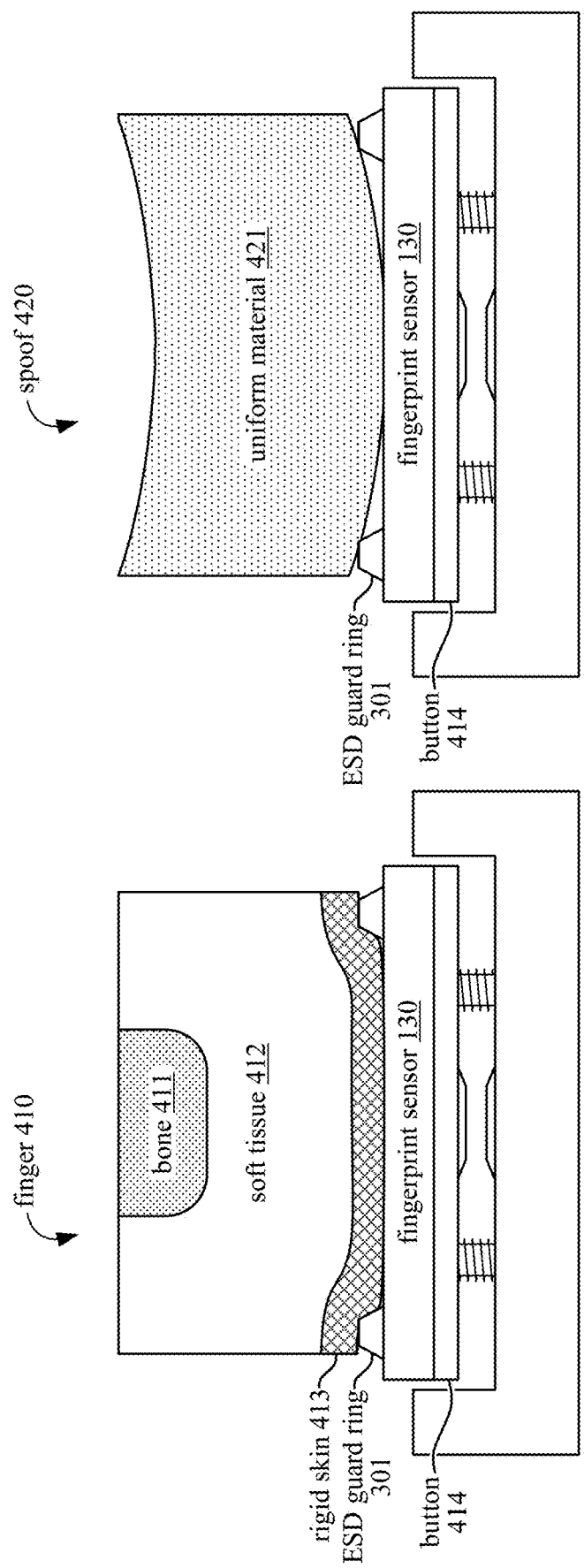
FIG. 4 illustrates cross-sectional views of a fingerprint sensor and button assembly, according to an embodiment.

FIG. 4 illustrates cross sectional views of a finger 410 and a spoof 420 on a fingerprint sensor 130. An ESD guard ring 301 provides edges that are raised above the surface of the fingerprint sensor 130. Further, the fingerprint sensor 130 is supported on a mechanical button 414. The mechanical button 414 is configured to activate in response to an activation force applied to in a downward direction to the upper surface of the fingerprint sensor 130. Activation of the button 414 causes an electrical connection to be established or a signal to be generated that can be detected by the fingerprint sensor controller 120 or the host device 110.

The finger 410 includes a rigid outer skin 413 that is supported by soft tissue 412 and bone 411, and is positioned on the surface of the fingerprint sensor 130 so that the rigid skin 413 conforms to the surface of the fingerprint sensor 130. The rigid skin 413 carries the features of the fingerprint, such as ridges and valleys, that are to be imaged by the fingerprint sensor 130. The elasticity of the soft tissue 412 allows the rigid skin 413 to conform against the surface of sensor 130, even near the raised edges of the ESD guard ring 301. As a result, the fingerprint image captured by the sensor 130 is characterized by uniform mean intensities across the subareas TL, TR, BL, BR, and C.

In comparison, the spoof 420 is made from a uniform material 421 that does not conform to the surface of the fingerprint sensor 130 as uniformly as the finger 410. In particular, the spoof 420 requires more pressure to make the portions of the spoof 420 near the ESD guard ring 301 conform to the surface of the sensor 130 because the uniform material is less compliant than the subdermal soft tissue 412 of the finger 410.

Figure 5:
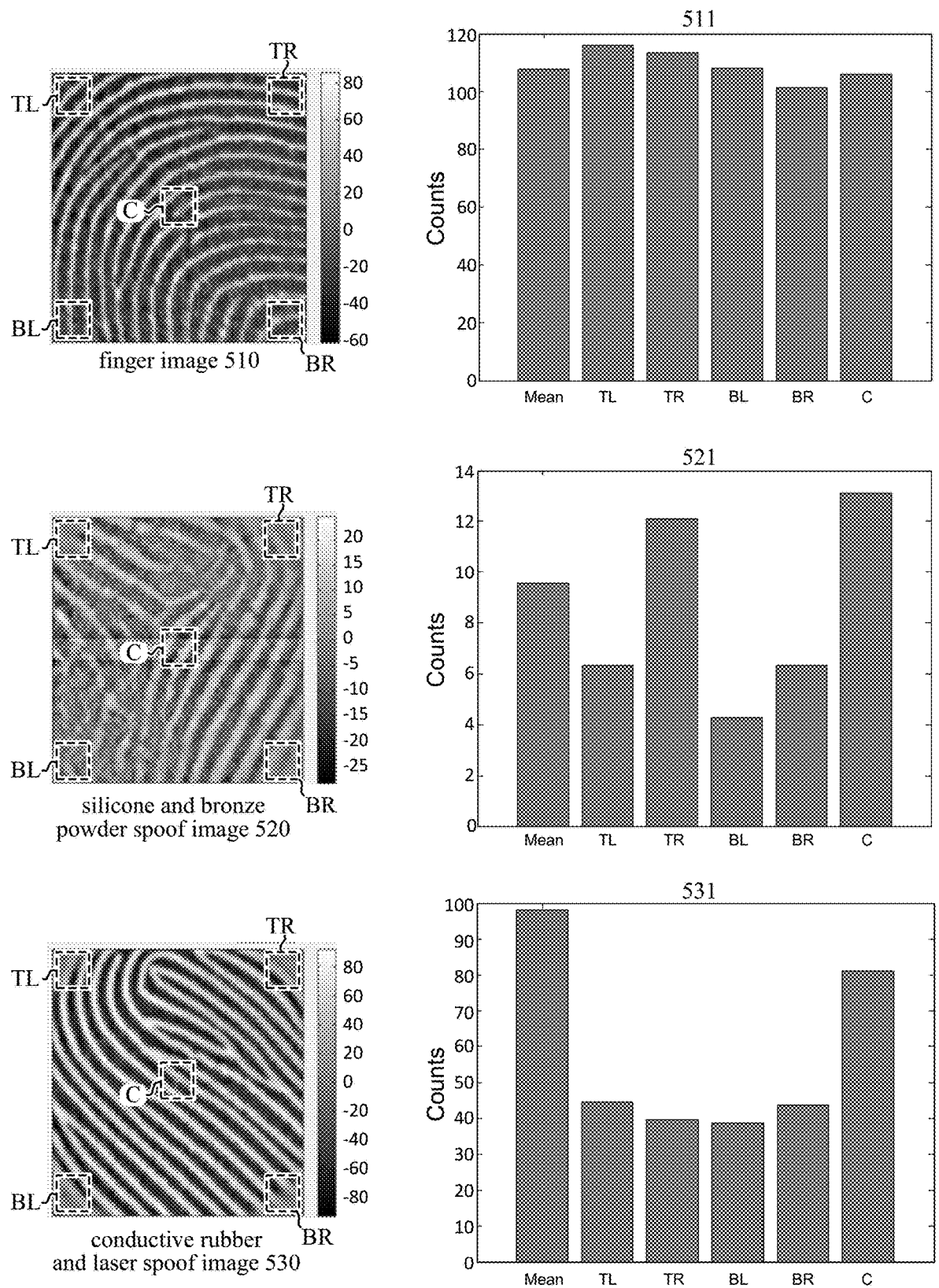
FIG. 5 illustrates results of testing various materials using an area coverage test for spoof detection, according to an embodiment.

FIG. 5 illustrates results of area coverage tests for a finger, a silicone and bronze powder spoof, and a laser etched conductive rubber spoof. Bar graph 511 illustrates the mean intensity values in counts for the entire image ('Mean') and for the TL, TR, BL, BR, and C areas of finger image 510 acquired from fingerprint sensor 130. Similarly, bar graph 521 illustrates the mean intensity values for these same areas in the silicon and bronze powder spoof image 520 and bar graph 531 illustrates the mean intensity values for these areas in the conductive rubber and laser spoof image 530.

In the graph 511 for the real finger, the count values representing the mean intensities for the TL, TR, BL, BR, and C areas are all within 20 counts of each other. Furthermore, the mean intensity for the image 510 is greater than 100 counts. In the graph 521 for the silicone and bronze powder spoof, the mean intensities for the tested subareas are also within 20 counts of each other; however, the mean intensity over the entire image 520 is less than 10 counts. This spoof can therefore be rejected using a threshold value of 50 counts for the mean intensity over the entire image.

In the graph 531, the mean intensity over the entire image 530 is greater than the 50 count threshold; however, the mean intensity for area C exceeds any of the other mean intensity values by at least 30 counts. In contrast, the mean intensity values for a real finger are within 20 counts of each other. The conductive rubber spoof can therefore be detected based on a 20 count threshold for the difference between any two mean intensity values for the TL, TR, BL, BR, and C areas.

In theory, a spoof object having the same dimensions as the recessed portion of the fingerprint sensor 130 would be able to achieve uniform coverage of the sensor 130; however, this is difficult to achieve in practice. A spoof that is even slightly smaller than the recess would result in an image that is smaller than expected and would be easily detected as a spoof. Furthermore, an embodiment of the fingerprint sensor controller 120 implements a timer to ensure that the image of the object is captured within a predetermined time limit from the time the object is detected at the sensor 130. This limits the amount of time available for an attacker to rotate or otherwise reposition the spoof object until the sensor 130 surface is uniformly covered.

For some spoof materials, applying enough pressure to cause the corners of the spoof to conform to the corner areas TL, TR, BL, and BR causes the spoof to fail for other reasons. For example, thin film silicone spoofs provide an adequate image only when applied to the sensor 130 with only a small applied force. When the applied force is increased to fill the corners of the sensor 130, the ridges and valleys of the spoof stick together and are obscured due to compression. Therefore, even if a silicone spoof passes the mean intensity value based anti-spoofing tests, it will still fail to match as a real fingerprint.

In one embodiment, the calculations for the area coverage test for subdermal compliance of an object is performed by the spoof detection logic 208. Thus, the spoof detection logic 208 measures the subdermal compliance of the object by comparing two or more portions (e.g., TR, TL, BR, BL, and C) of an image of the surface pattern of the object. In general, the two or more portions of the image are captured from an subarea of the fingerprint sensor near the center (e.g., area C) and from subareas of the fingerprint sensor that are each closer to a raised edge of the ESD guard ring 301 (e.g., areas TR, TL, BR, and BL) than the center subarea. The spoof detection logic 208 distinguishes the object as a finger or a spoof based on determining whether the mean intensity value for the entire image exceeds a threshold and/or whether a mean intensity value of any of the subareas TR, TL, BR, BL, and C differs by at least a threshold amount from a mean intensity value of any other one of the subareas.

In one embodiment, the fingerprint sensor 130 and mechanical button 414 assembly as illustrated in FIG. 4 is used to measure subdermal compliance of an object on the fingerprint sensor 130. In FIG. 4, the fingerprint sensor 130 is positioned on top of the mechanical button 414, so that the mechanical button 414 can be activated when the force applied to the fingerprint sensor 130 exceeds an activation force of the mechanical button 414. Activation of the mechanical button 414 thus increases and decreases the force applied by the object to the fingerprint sensor 130 in a controlled manner. The spoof detection logic 208 determines a difference in contrast between surface pattern images captured during the application of high force and low force to measure the subdermal compliance property of the object. An image of the object that is captured when the button 414 is not activated is associated with a low force that is less than the activation force of the button 414. An image of the object that is captured when the button 414 is activated is associated with a high force that is at least the activation force of the button 414.

In order to capture these images associated with different levels of applied force, the image capture is triggered by signals from the fingerprint sensor 130 and the mechanical button 414. A first image of the surface pattern of the object is captured in response to the finger detector 203 detecting the presence of the object at the sensing surface of sensor 130 prior to activation of the mechanical button 414. In one embodiment, the image capture is initiated after a certain amount of the fingerprint sensor 130 is covered or after a minimum level of force is applied by the object to the sensor 130. Since the button 414 is not activated at the time of the image capture, the first image is captured at a time when the force applied by the object to the sensor 130 is less than an activation force of the button 414.

A second image is captured in response to activation of the mechanical button 414. Since this image capture occurs during activation of the button 414, the second image is captured when the force applied by the object to the sensor 130 is at least the activation force of the button 414. The spoof detection logic 208 distinguishes the object as either a finger or a spoof based on comparing the first image of the surface pattern of the object and the second image of the surface pattern. In particular, the spoof detection logic 208 compares characteristics such as the change in contrast or the change in area coverage between the first and second images. For example, certain spoof materials exhibit a reduction in image contrast when more force is applied, which is not observed for actual fingers.

Another technique for measuring the subdermal compliance of an object is based on observing the dynamic range of the image intensity over the course of a button press or click. The dynamic range is a difference between fixed threshold value and the maximum contrast value observed during the button press or click.

Figure 6:
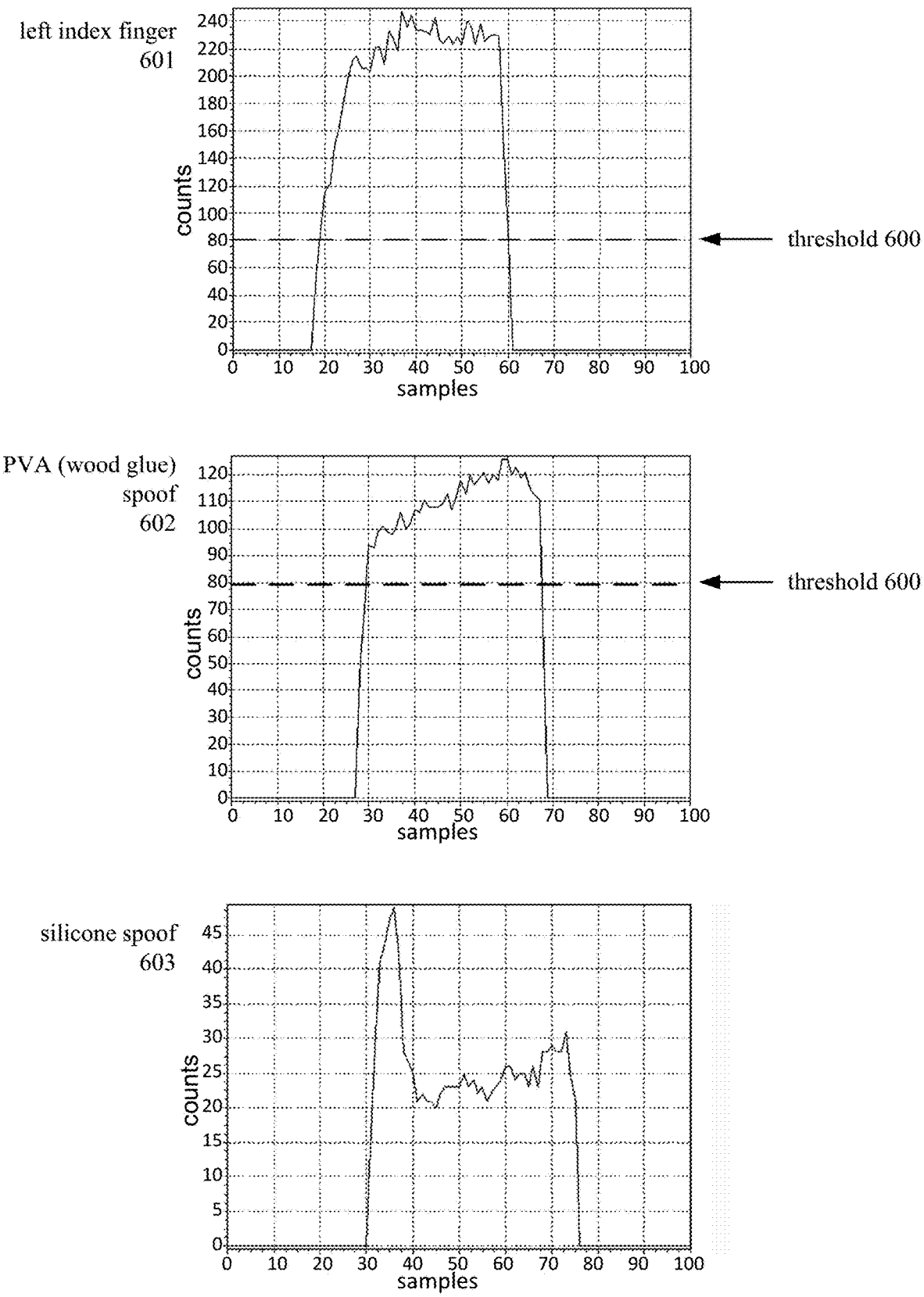
FIG. 6 illustrates sequential samples of contrast values recorded for various materials, according to an embodiment.

FIG. 6 illustrates 100 sequential samples of contrast values recorded for each of a finger, a PVA with wood glue spoof, and a silicone spoof over the course of a button press gesture. The contrast values (measured in counts) in the graphs 601, 602, and 603 represent the contrast calculated over the entire image. For this test, the dynamic range of the image is defined as a difference between a fixed threshold contrast value 600 having a value of 80 counts and a maximum contrast recorded during the button press gesture.

For a real finger, the dynamic range is typically more than 90 counts; for example the index finger graph 601 indicates a dynamic range of approximately 160 counts. In contrast, a spoof object typically has a dynamic range of 30-50 counts. For example, the PVA (wood glue) graph 602 indicates a dynamic range of approximately 40 counts. The silicone spoof graph 603 indicates a maximum contrast value that does not exceed the threshold 600. Thus, the spoof detection logic 208 can identify the PVA and silicone materials as spoofs because their respective dynamic ranges do not fall within the expected range for a real finger.

In addition, certain spoof materials, such as silicone, exhibit negative peaks in the image contrast over the course of the button press. As illustrated in FIG. 6, a midsection of the silicone spoof graph 603 indicates a decrease in contrast followed by an increase in contrast. Accordingly, an embodiment of the spoof detection logic 208 detects the negative peak and rejects the spoof on this basis.

In alternative embodiments, the button press or click gesture can be implemented in different ways to increase or decrease the force applied by the object to the sensor 130 over the sampling period, or shift the applied force from one part of the object to another. For example, the dynamic range can be measured over a double click, rotation, or other gesture for manipulating the button 414.

Another property of an object that can be measured to determine whether the object is a finger or a spoof is the surface adhesiveness of the object. For a real finger, the image contrast does not decrease when the applied force of the finger against the surface of the fingerprint sensor 130 decreases after a hard press (e.g., approximately 1 kg) due to adhesion of the skin surface of the finger to the surface of the sensor 130. For spoof materials, the image contrast can vary in several different ways in response to changes in the applied force. For flexible spoof materials (e.g., rubber), the image contrast and applied force both change in the same way. For rigid spoof materials (e.g., copper based spoofs), the image contrast does not change for different force levels. In one embodiment, differences in the surface adhesiveness property between fingers and spoof materials are discerned using a force sensor that records the force applied by the object to the fingerprint sensor surface. These force values are then correlated to contrast values calculated from captured images of the object.

Figure 7A:
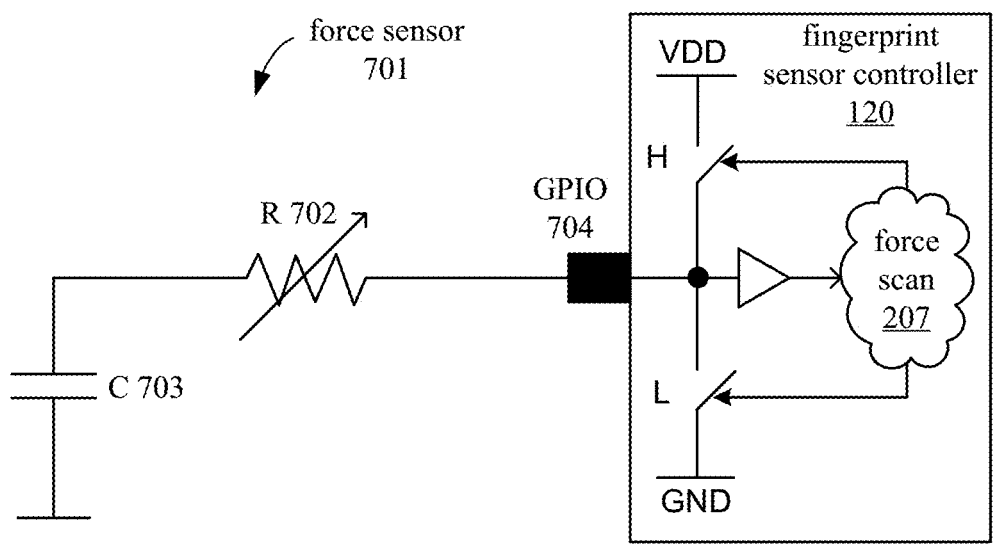
FIG. 7A illustrates a circuit diagram of a force sensor, according to an embodiment.

FIG. 7A illustrates a force sensor 701 that is connected to the fingerprint sensor controller 120, according to an embodiment. The force sensor 701 is operated by the force sensor scan module 207, which is further connected to provide force measurements to the spoof detection logic 208 for use in detecting spoofs. The force sensor 701 includes a capacitance 703 and a variable resistance 702 that changes in response to applied force. The variable resistor 702 is connected to a general purpose input/output (GPIO) pin 704 of the fingerprint sensor controller 120. The force sensor scan module 207 drives the GPIO pin 704 with a signal by selectively connecting the H and L switches to VDD or ground (GND), respectively.

Figure 7B:
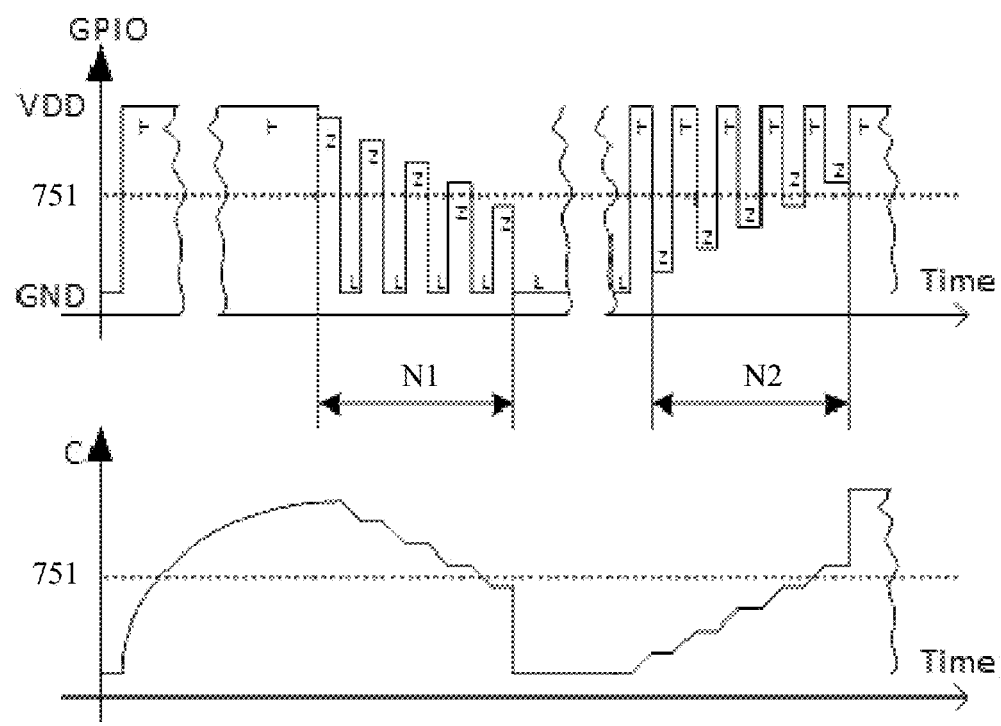
FIG. 7B illustrates signals generated during operation of a force sensor, according to an embodiment.

FIG. 7B illustrates the voltage at the GPIO pin 704 (top graph) and the voltage across the capacitor 703 (bottom graph) resulting from operation of the switches H and L, according to an embodiment. The force sensor scan module 207 charges the capacitor 703 by closing the H switch to connect the GPIO pin 704 to VDD. The capacitor 703 is then discharged over the time period N1 as the force sensor scan module 207 operates the L switch to alternately switch the GPIO pin 704 between a high-impedance (Z) state and ground. Once the voltage at GPIO 704 falls below the threshold 751 during a high-impedance period, the force sensor scan module 207 discharges the capacitor 703 to ground, then recharges the capacitor 703 over the time period N2 by alternately switching the GPIO pin 704 between a high-impedance state and VDD. When the GPIO voltage exceeds the threshold 751 during a high-impedance period, the total number of switching cycles for both the N1 and N2 durations is recorded as the force output. Since the charge and discharge rate of the capacitance 703 depends on the value of variable resistor 702, the total number of switching cycles for periods N1 and N2 (i.e., the force output) corresponds to the force applied to the variable resistor 702. In alternative embodiments, the resistance 702 is held constant while the capacitance 703 varies with the applied force.

Figure 8A:
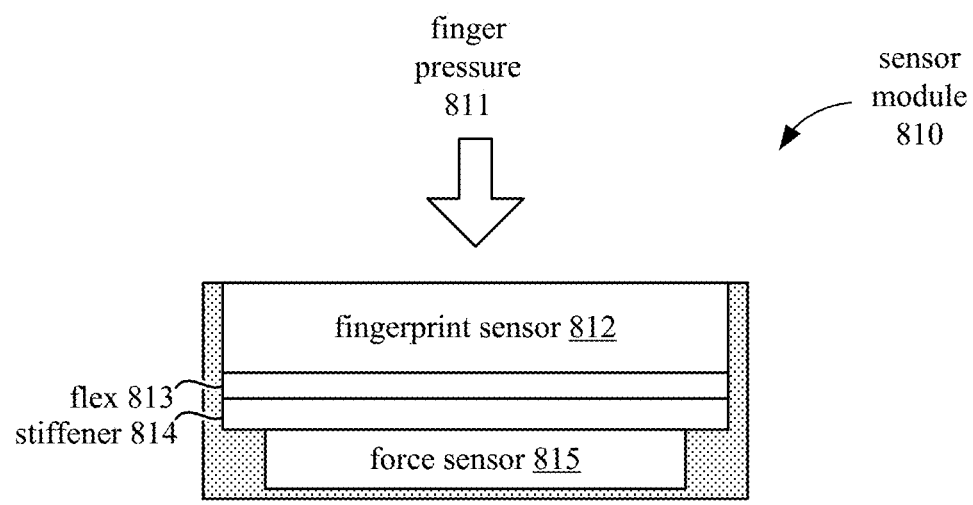
FIG. 8A illustrates a cross-sectional view of a fingerprint sensor module, according to an embodiment.

FIG. 8A illustrates a cross-sectional view of a sensor module 810 that includes a fingerprint sensor 812 and a force sensor 815 for measuring a force due to finger pressure 811, according to an embodiment. The fingerprint sensor 812 is supported by a stiffener 814 and flexible material 813. The force sensor 815 is a separate component located between the stiffener 814 and the bottom of the sensor module 810. Different types of force sensors can be used in place of force sensor 815, such as piezoelectric, inductive, optical and others.

Figure 8B:
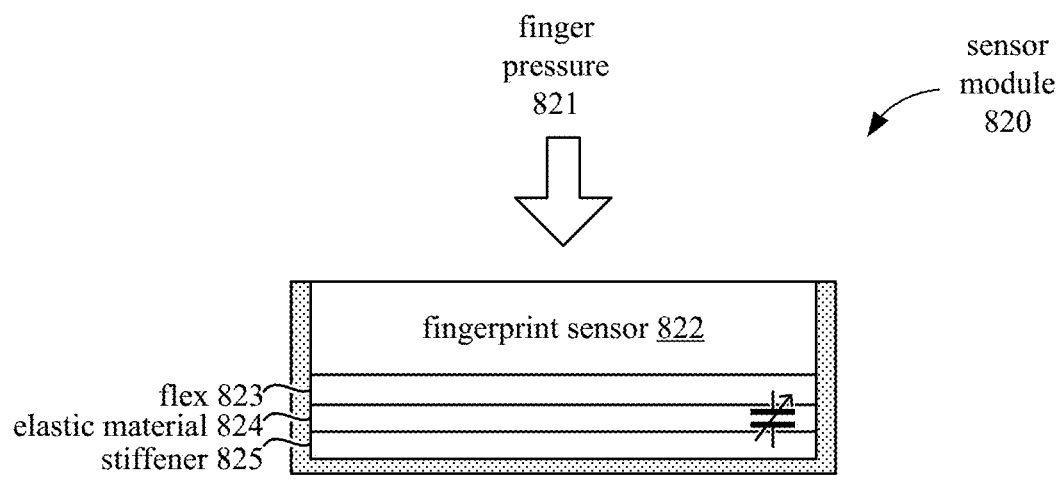
FIG. 8B illustrates a cross-sectional view of a fingerprint sensor module, according to an embodiment.

FIG. 8B illustrates a cross-sectional view of a sensor module 820 that includes a fingerprint sensor 822 and a capacitive force sensor formed from the flexible material 823, elastic material 824, and stiffener 825. The elastic material 824 has a thickness of 0.1 millimeters to 0.3 millimeters, and separates the conductive flexible material 823 and stiffener 825 layers, which act as two plates of a variable capacitor. Finger pressure 821 causes the distance between the flexible material 823 and stiffener 825 to decrease; thus, the capacitance increases in response to the applied force.

In one embodiment utilizing a sensor module 810 connected to a fingerprint sensor controller 120, in order to determine a correlation between the applied force and the image contrast, the fingerprint sensor controller 120 continuously scans the force sensor 815. When an object touches the fingerprint sensor 812, the image scan module 205 implements a fast scan of a small subarea of the fingerprint sensor 812 to quickly determine a baseline image contrast for the object. The baseline contrast value is used to compensate for contrast variations between different fingers; thus, contrast changes resulting from changes in the applied force are calculated relative to the baseline for the finger.

To measure a change in the image contrast for an object that results from a change in the applied force of the object to the fingerprint sensor, the fingerprint sensor controller 120 acquires a minimum of two force measurements and two corresponding image contrast measurements. Thus, the controller 120 measures a first force applied by the object to the fingerprint sensor during capturing of a first image of a surface pattern of the object. After measuring the first force, the controller 120 measures a second force applied by the object to the fingerprint sensor during the capturing of a second image of the surface pattern of the object.

For detecting the surface adhesiveness property of the object, the fingerprint sensor controller 120 measures the first and second forces such that the second force occurs after the first force and is less than the first force. In other words, the force applied by the object under test decreases from the first force measurement to the second force measurement. The corresponding image contrast values are compensated by the baseline contrast, and then compared to determine whether the object adheres to the fingerprint sensor surface. The object is thus distinguished as a finger or a spoof object based on the difference in contrast between the first and second images.

In one embodiment, the fingerprint sensor controller 120 acquires more than two force and image contrast measurement pairs in order to more fully characterize the relationship between the applied force and the image contrast for the object.

Figure 9:
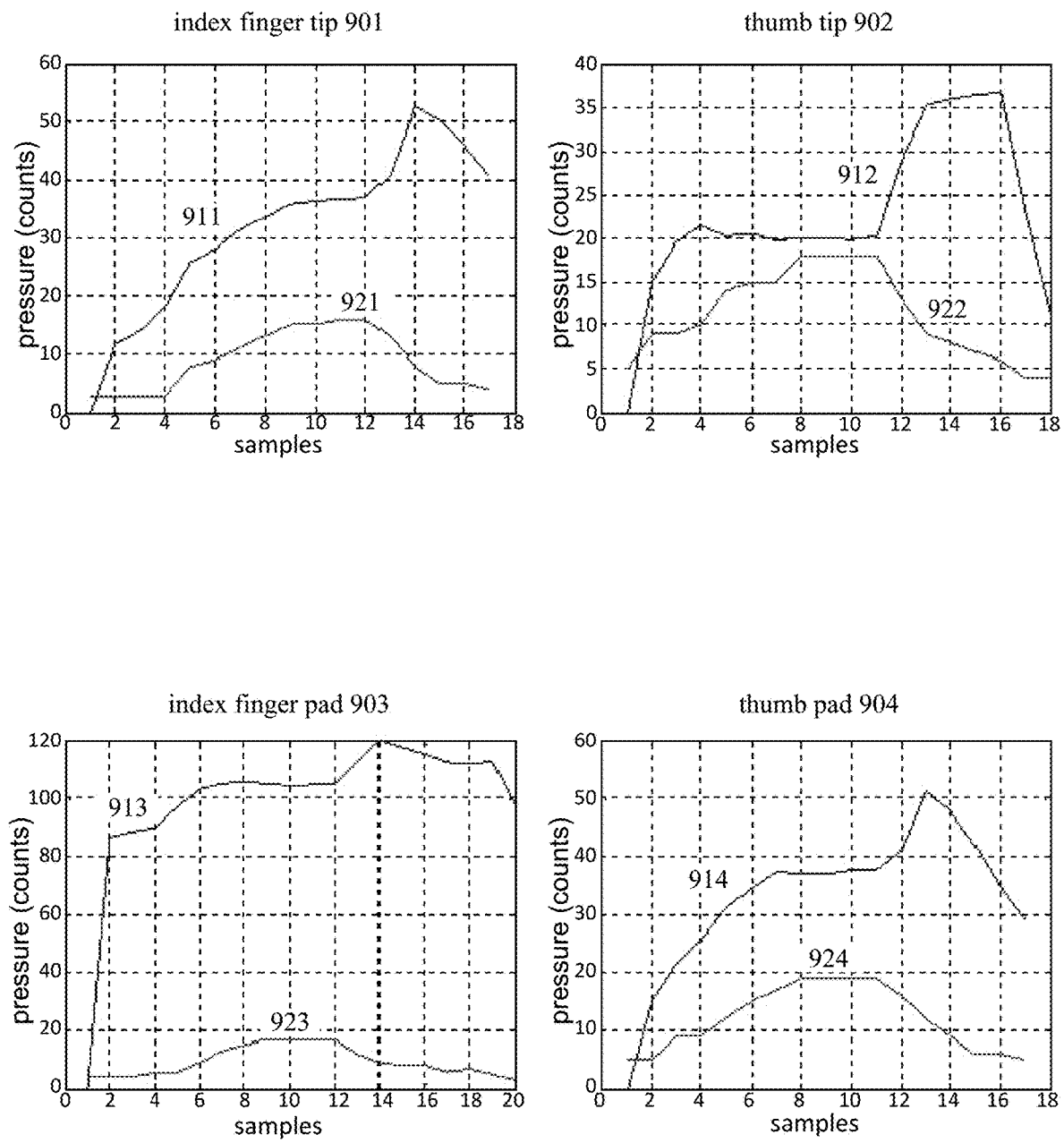
FIG. 9 illustrates relationships between directly measured force and image contrast for different fingers, according to an embodiment.

FIG. 9 includes four graphs showing the relationship between directly measured force and image contrast for an index finger tip 901, thumb tip 902, index finger pad 903, and thumb pad 904. For these graphs, the image contrast is represented by curves 911, 912, 913, and 914, while the corresponding direct force measurements are represented by curves 921, 922, 923, and 924. As illustrated in FIG. 9, the image contrast values for these fingers do not decrease in response to the applied force of the finger against the surface of the fingerprint sensor 130 decreasing after a hard press (e.g., approximately 1 kg). This behavior is due to adhesion of the skin surface of the finger to the surface of the fingerprint sensor 130.

Figure 10:
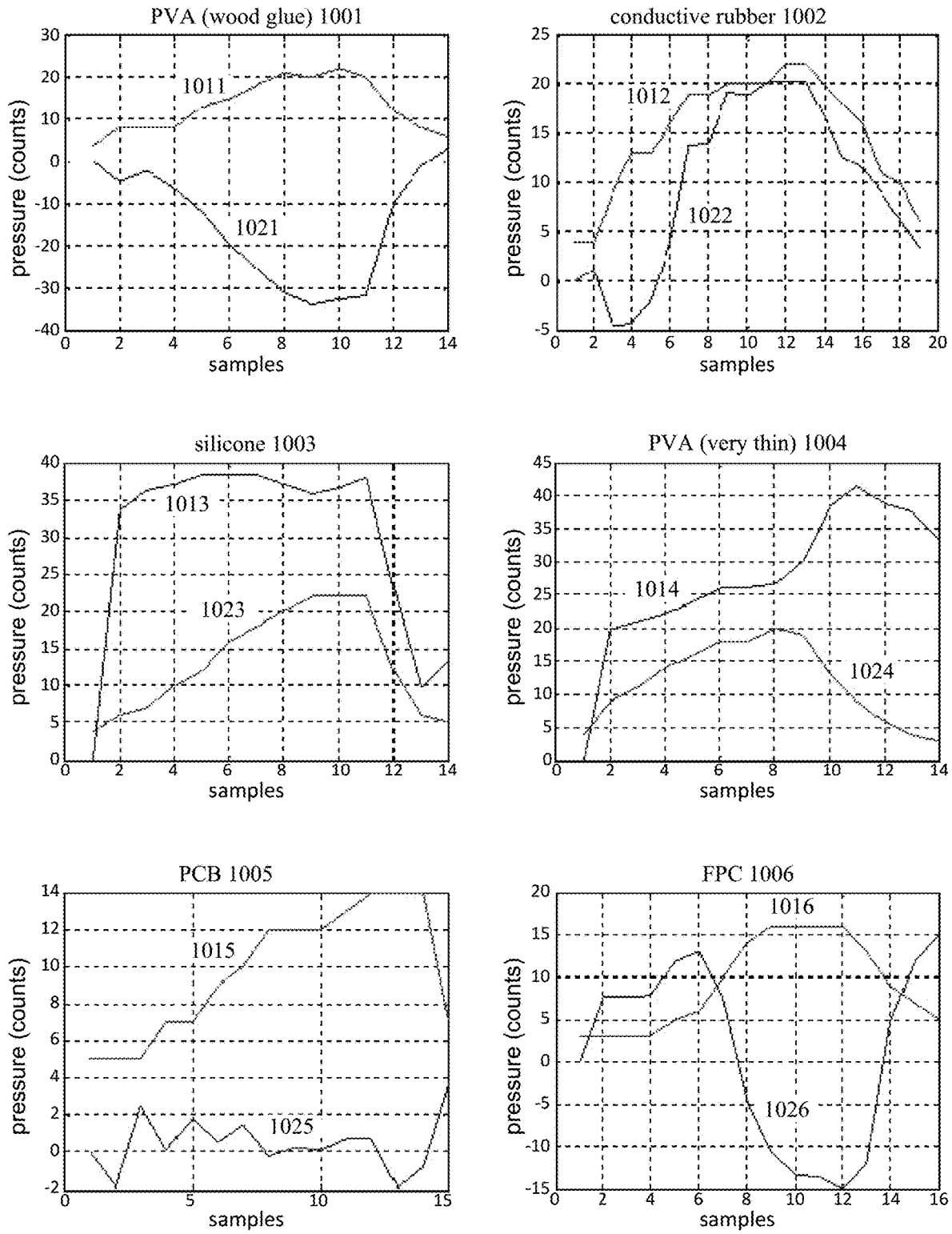
FIG. 10 illustrates relationships between directly measured force and image contrast for various spoof materials, according to an embodiment.

FIG. 10 includes six graphs showing the relationship between directly measured force and image contrast for PVA (wood glue) 1001, conductive rubber 1002, silicone 1003, thin PVA 1004, PCB 1005, and FPC 1006 spoofs. For these graphs, the image contrast is represented by curves 1011, 1012, 1013, 1014, 1015, and 1016, while the corresponding direct force measurements are represented by curves 1021, 1022, 1023, 1024, 1025, and 1026. As illustrated in FIG. 10, the image contrast values for these spoofs vary in different ways relative to the direct force measurements.

The graph 1001 for the PVA spoof shows that for this type of spoof material, the image contrast decreases with increasing applied force. This characteristic allows for rejection of PVA spoofs based on this negative peak characteristic of the image contrast, even if corresponding force measurements are not acquired.

The graph 1002 for the rubber spoof material shows an image contrast curve 1012 that corresponds relatively closely to the measured force curve 1022. Thus, a rubber spoof can be distinguished from a real finger because the image contrast does not remain high after the applied force is decreased following a hard press.

The graph 1004 for the thin (approximately 0.1 millimeter) PVA spoof indicates a surface adhesiveness property more similar to that of an actual finger. In some embodiments, one or more of the other spoof detection techniques disclosed herein may be used in conjunction with the surface adhesiveness test for detecting thin PVA spoof objects.

In alternative embodiments, values other than the image contrast can be correlated with the applied force, such as changes between ridge and valley intensities, maximum or minimum values over the image, or other values derived from the captured image.

In one embodiment, the fingerprint sensor controller 120 implements an impedance based spoof detection technique by measuring the ability of a purported finger to couple various signals between two groups of TX electrodes and an RX listener electrode in the fingerprint sensor 130. Analyzing the amplitudes and amplitude ratios of the complex conductivity measured for the signal generated at the RX listener electrode is then used to detect spoof materials having medium conductivity, such as silicone mixed with metal powder, spoofs covered with graphite film, conductive rubber spoofs, etc.

Figure 11:
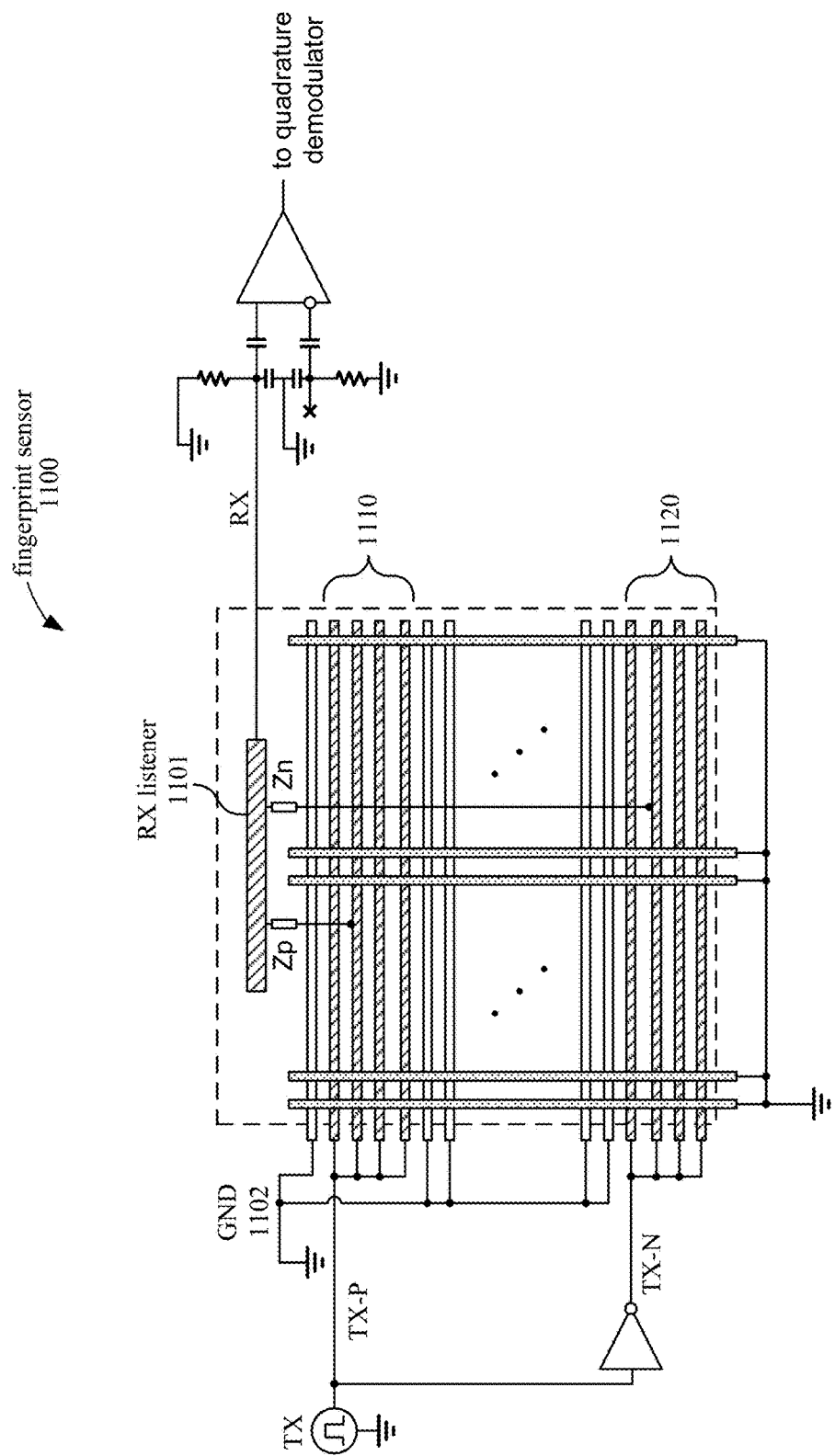
FIG. 11 illustrates an embodiment of a fingerprint sensor.

FIG. 11 illustrates a fingerprint sensor 1100 that includes electrodes arranged for performing impedance based spoof detection. The set of electrodes in the fingerprint sensor 1100 include an RX listener electrode 1101, a first set of TX electrodes 1110, and a second set of TX electrodes 1120. The electrodes in the first set of TX electrodes 1110 are electrically connected to each other by a low resistance conductive path, and the electrodes in the second set of TX electrodes 1120 are similarly connected to each other. The electrode sets 1110 and 1120 are each connected to the RX listener electrode 1101 via different signal propagation paths. Electrode set 1110 is connected to RX listener electrode 1101 via a shorter signal propagation path having an impedance Zp. Electrode set 1120 is connected to RX listener electrode 1101 via a longer signal propagation path having an impedance Zn, which differs from Zp. The differences in the signal propagation paths allow the circuit to obtain more information about the electrical properties of the object under test.

Accordingly, the electrodes in set 1120 are adjacent to each other and are located on the opposite side of the fingerprint sensor 1100 from the RX listener electrode 1101. The electrodes in set 1110 are adjacent to each other and are located on the same side of the fingerprint sensor 1100 as the RX listener electrode 1101. The number of electrodes in electrode sets 1110 is equal to the number of electrodes in set 1120, and the electrodes in both sets 1110 and 1120 do not intersect with each other. As illustrated in FIG. 11, each set includes four electrodes. Electrodes that are not included in either set 1110 or 1120 are grounded via ground node 1102.

In one embodiment, the hardware scan engine 201 drives the TX electrode set 1110 with an in-phase TX signal (TX-P) while driving the TX electrode set 1120 with an antiphase version (TX-N) of the TX signal. The antiphase signal TX-P is phase shifted by 180 degrees relative to the in-phase TX-N signal. The electrode sets 1110 and 1120 of the fingerprint sensor 1100 are thus driven while an object is present at the surface of the fingerprint sensor 1100. The object couples the TX-P and TX-N signals to the RX listener electrode 1101, with the resulting RX signal varying depending on the electrical characteristics of the object.

In an alternative embodiment, the two TX electrode groups 1110 and 1120 driven in opposite phases can instead be replaced with a single TX group. Such an embodiment additionally includes a hardware baseline compensation circuit to prevent channel saturation.

In one embodiment, the hardware scan engine 201 applies the in-phase TX-P and antiphase TX-N signals to their respective electrode groups at multiple different frequencies. Thus, while the object under test is on the fingerprint sensor 1100, the scan engine 201 generates a first RX signal at the RX listener electrode 1101 by applying an in-phase TX-P signal at a first frequency F0 to the TX electrode set 1110 while applying the antiphase TX-N signal at frequency F0 to the TX electrode set 1120. The scan engine 201 subsequently generates a second RX signal at the RX listener electrode 1101 by applying an in-phase TX-P signal at a second frequency F1 to the TX electrode set 1110 while applying the antiphase TX-N signal at frequency F1 to the TX electrode set 1120.

In one embodiment, a simple approach is used where the frequency sweep includes only two corner frequencies F0 and F1. In one embodiment, F0 is equal to 1.5 MHz and F1 is equal to 9 MHz. In other embodiments, the scan engine 201 performs a sweep of the TX frequency, repeating the above process with more than two frequencies while measuring and processing the resulting coupling amplitudes and phases for each frequency.

Figure 12:
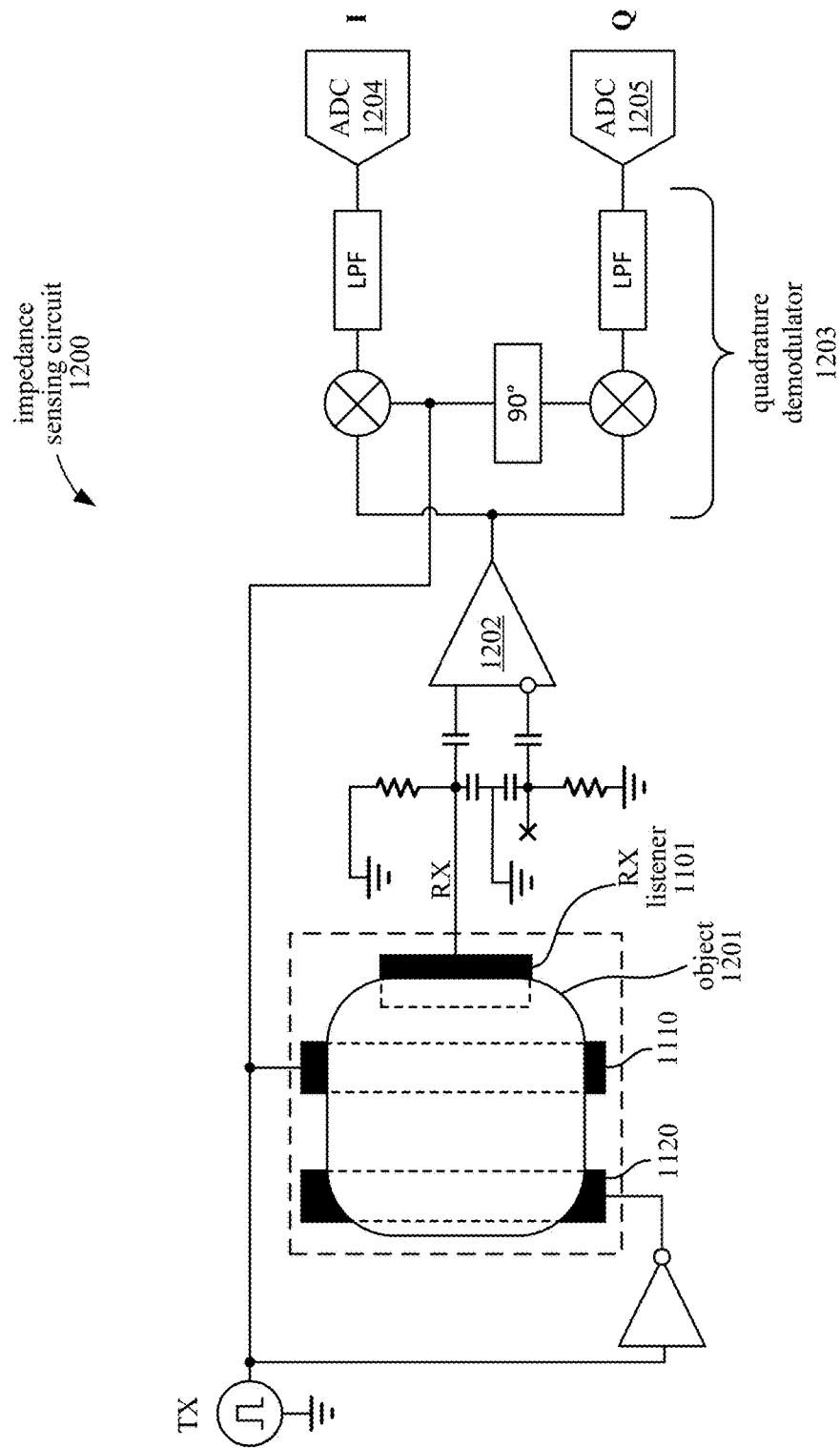
FIG. 12 illustrates an embodiment of an impedance sensing circuit.

FIG. 12 illustrates an impedance sensing circuit 1200 with a quadrature demodulator 1203 for measuring the complex conductivity of an object 1201 for spoof detection. The impedance sensing circuit 1200 includes the TX electrode sets 1110 and 1120 and the RX listener electrode 1101. As previously described, the TX-P and TX-N signals used to drive the electrode sets 1110 and 1120, respectively, are coupled to the RX listener electrode 1101 through the object 1201. The resulting RX signal is amplified by amplifier 1202 and passed to the quadrature demodulator 1203. The resulting I and Q components from the quadrature demodulator 1203 are converted by the analog-to-digital converters (ADCs) 1204 and 1205, respectively. The quadrature sensing channel 1203 thus provides not only amplitude but also phase information. For detecting whether the object 1201 is a spoof, the spoof detection logic 208 can determine whether the measured phase is in the predefined phase range typical for a real finger. In alternative embodiments, the spoof detection logic 208 performs other analyses on the individual I and Q components from the quadrature demodulator 1203.

In one embodiment, the impedance sensing circuit 1200 is subjected to a baseline calibration procedure to compensate for ADC offsets and parasitic open air coupling. According to a baseline calibration process, I and Q components are repeatedly captured during open air conditions (i.e., when no object is present at the fingerprint sensor 1100). Averaged values of the captured I and Q components are then subtracted from the (I, Q) result of the anti-spoofing scan.

In one embodiment, the impedance sensing circuit 1200 tests the object 1201 using only a single frequency F0. In this case, the spoof detection logic 208 determines whether resulting measured amplitude and phase are in a predefined range typical for a real finger. The spoof detection logic 208 distinguishes the object 1201 as a spoof if the measured amplitude and/or phase fall outside of the expected range.

In one embodiment in which the impedance sensing circuit 1200 tests the object 1201 using multiple frequencies, the spoof detection logic 208 distinguishes the object 1201 as a spoof or a real finger by calculating an amplitude of the complex conductivity for each frequency based on the I and Q components generated for that frequency, then determining whether the amplitude for any of the frequencies falls outside an expected range for a real finger. The spoof detection logic 208 additionally calculates one or more amplitude ratios using the calculated amplitudes and determines whether any amplitude ratio falls outside an expected range for a real finger.

Spoof materials having low conductivity are rejected as a result of small TX-RX coupling by the object, which leads to an amplitude that falls outside the expected range for a real finger. Highly conductive spoof materials are rejected based on a small resulting amplitude of the TX-RX coupling, since the in-phase TX-P signal is compensated by the antiphase TX-N signal through coupling by the object. The small resulting amplitude falls below the expected range for a real finger. Most spoof materials having medium conductivity can be rejected based on measuring the conductivity amplitudes at different frequencies and analyzing the amplitudes and amplitude ratios to determine whether these values fall within an expected range for a real finger.

Figure 13:
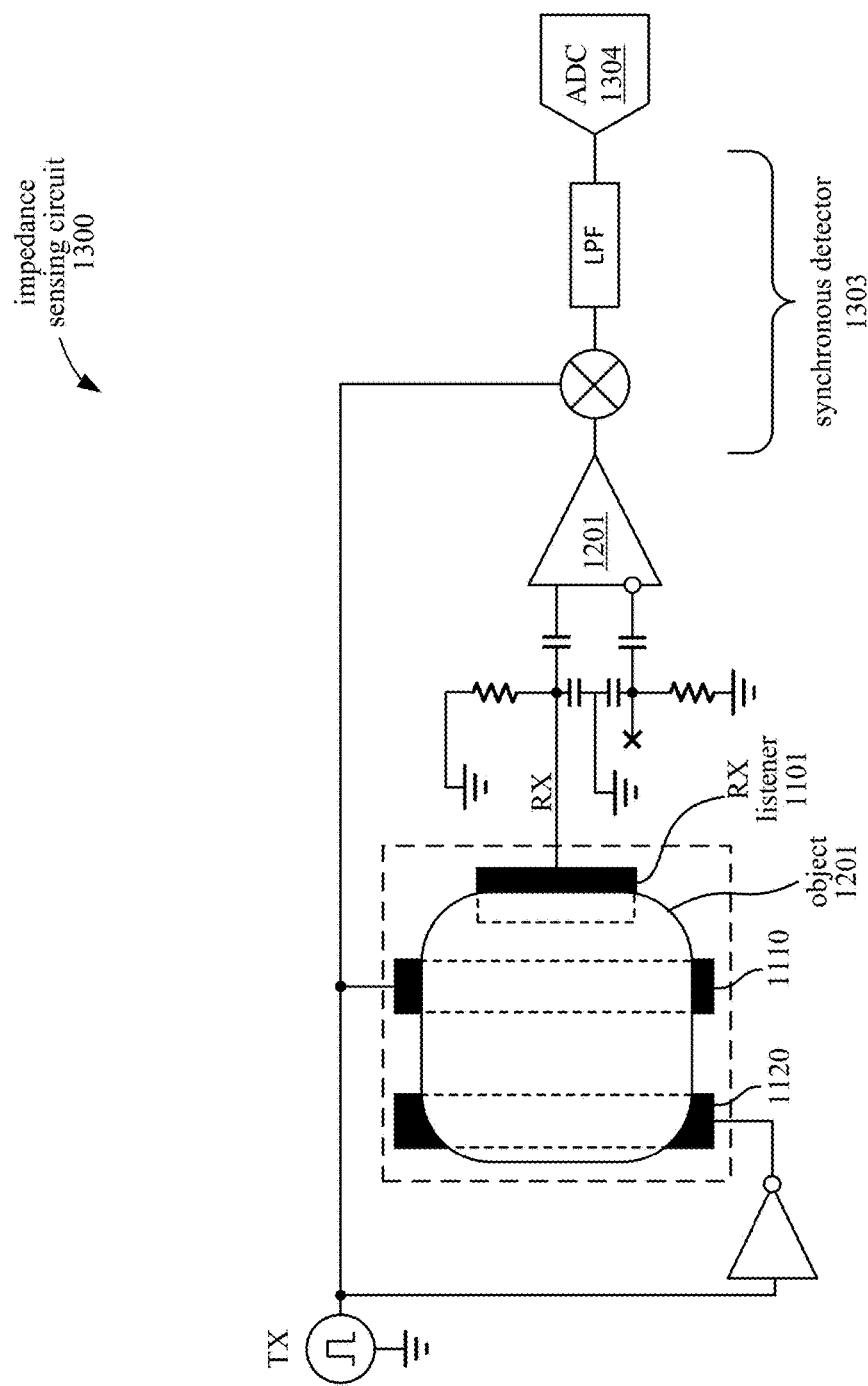
FIG. 13 illustrates an embodiment of an impedance sensing circuit.

FIG. 13 illustrates an impedance sensing circuit 1300 with a synchronous detector 1303 coupled to ADC 1304 for measuring the complex conductivity of an object 1201 for spoof detection. For each operation frequency, the phase delay of the reference signal is swept to find the maximum amplitude. The spoof detection logic 208 then distinguishes the object 1201 as a spoof or a finger by determining whether the resulting amplitude falls in the expected range for a real finger.

Figure 14A:
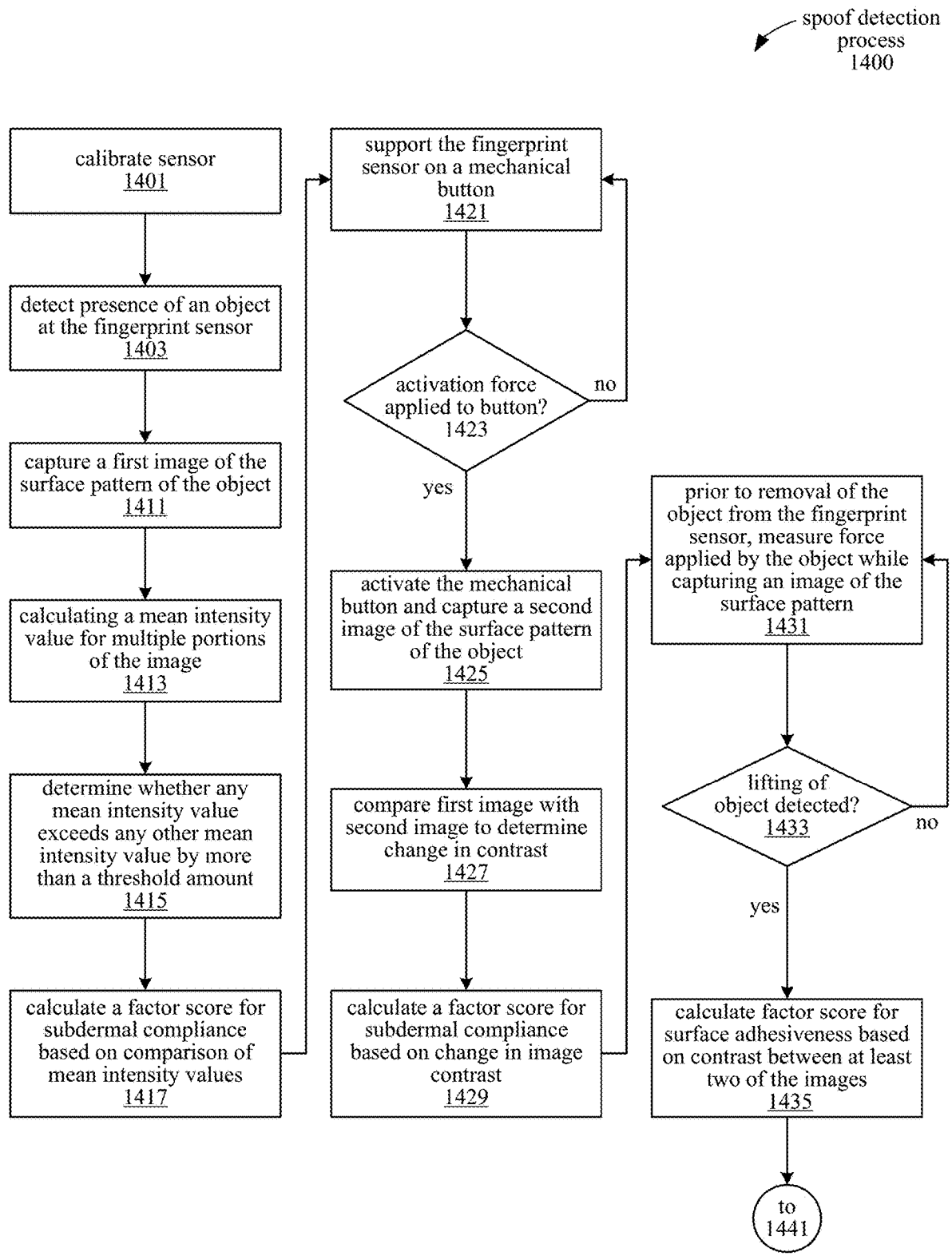
FIGS. 14A and 14B illustrate a process for detecting a spoof object, according to an embodiment.
Figure 14B:
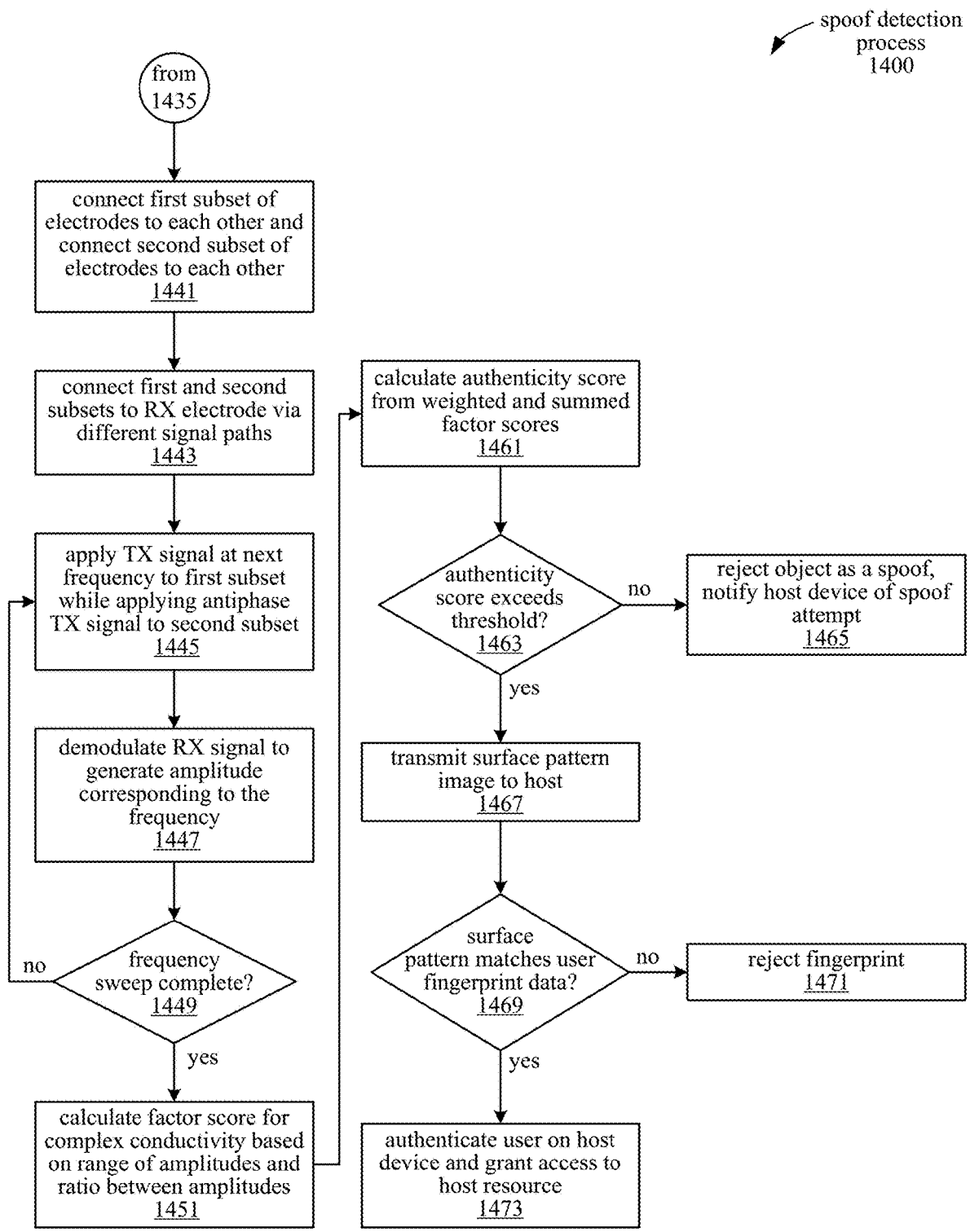

FIGS. 14A and 14B are flow diagrams illustrating a process 1400 for detecting a spoof object at a fingerprint sensor. Operations in process 1400 are performed by components in the fingerprint sensing system 100, such as the fingerprint sensor 130, the fingerprint sensor controller 120, and the host device 110, or are performed by similar components.

The process 1400 begins at block 1401. At block 1401, the fingerprint sensing system 100 calibrates the fingerprint sensor 130 and other sensors connected to the system 100, such as a force sensor. For example, the system performs baseline calibration for the fingerprint sensor 130 by recording measurements during open air conditions, with no object on the sensor 130.

At block 1403, the finger detection scan 202 and finger detector 203 modules in the fingerprint sensor controller 120 detect the presence of an object at the fingerprint sensor 130. The finger detection scan module 202 periodically collects capacitance measurements from the sensor 130 and the finger detector 203 analyzes the data to determine whether an object is present at the sensor 130.

In response to detecting the presence of the object at the sensor 130 at block 1403, the fingerprint sensor controller 120 measures a set of physical and/or electrical properties of the object based on signals from the set of electrodes in the fingerprint sensor 103. These properties include the subdermal compliance, surface adhesiveness, and conductivity characteristics of the object.

At blocks 1411-1417, the fingerprint sensing system 100 performs a process for measuring the subdermal compliance of the object. The subdermal compliance of a finger is the elasticity of the soft tissue under the skin. For a spoof object, the subdermal compliance test measures the elasticity of the material supporting the surface layer of the spoof that carries the spoofed fingerprint pattern.

At block 1411, the system 100 captures a first image of the surface pattern of the object using the set of electrodes of the fingerprint sensor 130. In one embodiment, the capturing of the first image is performed within a preset time limit after detecting the presence of the object on the fingerprint sensor. This limits the amount of time available for a malicious user to attempt to defeat spoof detection by repositioning a spoof object on the sensor 130.

At block 1413, the spoof detection logic 208 calculates a mean intensity value for multiple portions of the captured image. In particular, the spoof detection logic 208 calculates a mean intensity value for each of the subareas TL, TR, BL, BR, and C, as illustrated in FIGS. 3A and 3B, by averaging the intensity values for pixels in the same subarea. In alternative embodiments, different calculated intensity values are used instead of or in addition to the mean intensity, such as the median intensity value, etc.

At block 1415, the spoof detection logic 208 compares two or more of the portions of the captured image. In particular, the spoof detection logic 208 compares the subareas TL, TR, BL, BR, and C by comparing the mean intensity values that were calculated for these subareas. The spoof detection logic 208 then calculates a factor score for subdermal compliance of the object based on determining whether the mean intensity value of any of the two or more portions differs by at least a threshold amount from a mean intensity value of any other portion of the two or more portions. Referring to FIG. 5, for example, the factor score is based on determining whether the mean intensity value for subarea C is more than a threshold of 20 counts different from the mean intensity value for any of the other subareas TL, TR, BL, and BR. The factor score is also based on whether a mean intensity for the entire image differs from any mean intensity value for any of the subareas TL, TR, BL, BR, and C by more than a threshold amount. At block 1417, the spoof detection logic 208 calculates a factor score that can be used for distinguishing the object as a spoof based on the comparisons and calculations performed at block 1415.

A simple factor score may be recorded as a Boolean variable, indicating whether the object passed or failed the test. For example, a TRUE value indicates that the subdermal compliance property of the object at the fingerprint sensor 130 is in the expected range for a real finger. In alternative embodiments, the factor score is represented as an integer or float value indicating how closely the measured property, such as subdermal compliance, matches a real finger.

At blocks 1421-1429, the fingerprint sensing system 100 measures the subdermal compliance of the object at the fingerprint sensor 130 using a button press or click gesture. By this process, the system 100 is able to correlate contrast values for the imaged surface of the object with the forces applied by the object to the sensor 130 at the time the images are captured.

At block 1421, the fingerprint sensor 130 is supported on a mechanical button. In one embodiment, the fingerprint sensor 130 is supported by a mechanical button 414 as illustrated in FIG. 4.

At block 1423, if no force is applied to the button 414 that exceeds the activation force of the button 414, the button 414 continues supporting the fingerprint sensor in the unactivated (e.g., raised) state. If a force exceeding the activation force of the button 414 is applied to the button 414, the button 414 is activated as provided at block 1425. Activation of the button 414 results in the button 414 being depressed and also causes an electrical connection to be made or a signal to be generated that can be detected by the fingerprint sensor controller 120. The controller 120 detects the activation and captures a second image of the surface pattern of the object while the button 414 is activated.

At block 1427, the spoof detection logic 208 compares the first image with the second image to determine a change in contrast between the images. Since the first image (captured at block 1411) is captured prior to activation of the button 414, the applied force associated with the first image is less than the activation force of the button 414. The second image is captured while the button 414 is activated and is therefore associated with an applied force that is at least as much as the activation force for the button 414. The spoof detection logic 208 compares the first and second images to determine the amount of change in the image contrast resulting from the change in applied force.

At block 1429, the spoof detection logic 208 calculates a second factor score for the subdermal compliance property of the object based on the comparison performed at block 1427. In one embodiment, the factor score is a Boolean value indicating whether the subdermal compliance property for the object adequately matches that of a real finger; alternatively, the factor score may be an integer, float, or other value that indicates how well the measured subdermal compliance matches the expected value for a real finger.

At blocks 1431-1435, the fingerprint sensing system 100 measures the surface adhesiveness of the object at the fingerprint sensor 130. The surface adhesiveness is measured using a force sensor to detect a decrease in the force applied by the object to the fingerprint sensor 130 and determine the change in image contrast, if any, resulting from the decrease in the applied force. For a finger, the image contrast does not decrease after a decrease in the applied force due to adhesion of the skin surface to the fingerprint sensor; however, many spoof materials do not exhibit this behavior.

At block 1431, prior to removal of the object from the fingerprint sensor, the force sensor scan module 207 in the fingerprint sensor controller 120 measures the force applied by the object while capturing an image of the surface pattern. In one embodiment, applied force and image contrast measurements are performed continuously and repeatedly until the object is removed from the fingerprint sensor 130.

At block 1433, the fingerprint sensor controller 120 detects whether the object has been lifted from the fingerprint sensor 130. In one embodiment, the removal of the object from the sensor 130 is determined based on one or both of the capacitance measurements from the fingerprint sensor 130 and measurements from the force sensor. If the object has not been lifted from the sensor 130, the force and image contrast measurements continue at block 1431. If the object has been lifted from the sensor 130, the process continues at block 1435.

At block 1435, the spoof detection logic 208 calculates a factor score for the surface adhesiveness of the object at the fingerprint sensor 130 based on a change in image contrast between at least two of the images captured at block 1431. In one embodiment, the spoof detection logic 208 identifies force and image contrast samples that indicate a decrease in applied force after a hard press of the object against the fingerprint sensor. Accordingly, the spoof detection logic 208 identifies a first force measurement having a high magnitude followed by a second force measurement that is measured after the first force and has a smaller magnitude than the first force, and then compares the image contrast values corresponding to the first and second force measurements.

In one embodiment, the factor score for the surface adhesiveness property is recorded as a Boolean value that indicates whether the change in contrast is within an expected range for a real finger. Alternatively, the factor score may be an integer or float value that indicates how closely the change in image contrast matches the expected contrast change for a real finger.

The flow diagram illustrating the spoof detection process 1400 continues at FIG. 4B. In FIG. 4B, blocks 1441-1451 represent a process for measuring the complex conductivity of an object at the fingerprint sensor 130. The conductivity measurement process is performed using an impedance measurement circuit 1200 that includes a fingerprint sensor 1100.

At block 1441, the fingerprint sensor controller 120 connects a first subset of TX electrodes to each other and connects as second subset of TX electrodes to each other. With reference to fingerprint sensor 1100 in FIG. 11, the connected sets of electrodes are electrode sets 1110 and 1120. During a normal image scan, each of the TX electrodes in these sets 1110 and 1120 are driven independently. Thus, switching from the normal scan mode to the conductivity measurement mode entails connecting the electrodes to form these sets 1110 and 1120. In one embodiment, the connections are made by operating one or more sets of switches.

At block 1443, the sets of TX electrodes 1110 and 1120 are connected to an RX listener electrode 1101 via different signal paths. Electrode set 1110 is connected to the RX listener electrode 1101 via a signal propagation path having impedance Zp, while electrode set 1120 is connected to the RX listener electrode 1101 via a longer signal propagation path having a different impedance Zn.

At block 1445, the begins a frequency sweep of the impedance sensing circuit 1200 by applying an in-phase TX-P signal and an antiphase TX-N signal to the TX electrode sets 1110 and 1120, respectively, at the next frequency in the frequency sweep range. In one embodiment, at the start of the frequency sweep, the initial frequency F0 has a value of 1.5 MHz.

At block 1447, the RX signal generated at the RX listener electrode 1101 due to application of the TX-P and TX-N signals is amplified by an amplifier 1202 and passed to a quadrature demodulator 1203 in the impedance sensing circuit 1200. The quadrature demodulator 1203 demodulates the amplified version of the RX signal to generate I and Q components, which are converted to digital values by ADC 1204 and ADC 1205, respectively. The values for I and Q are used to calculate amplitude and phase values for the frequency F0.

At block 1449, if the frequency sweep has not completed, the process 1400 returns to perform the operations of block 1445 for a second TX-P signal and a second TX-N signal for the next frequency in the sweep. The I and Q components are similarly obtained and the amplitude and phase values calculated for this new frequency. In one embodiment, the second frequency F1 has a value of 9 MHz. Thus, the blocks 1445, 1447, and 1449 repeat to obtain I and Q values for each of two or more frequencies included in the frequency sweep. When the frequency sweep is complete, the process 1400 continues at block 1451.

At block 1451, the spoof detection logic 208 calculates a factor score for the measured complex conductivity based on determining whether any of the measured amplitudes falls outside an expected range for an amplitude of a real finger. The factor score is also based on whether a ratio between two of the measured amplitudes falls outside an expected range for an amplitude ratio of a real finger. If any of the amplitudes or amplitude ratios are outside the expected ranges, the spoof detection logic 208 sets the factor score to indicate that the object is a spoof based on the complex conductivity test. If the amplitudes and amplitude ratios are all within the expected range, the logic 208 sets the factor score to indicate that the object is a real finger. Similar to other factor scores, the factor score for the complex conductivity measurement may be recorded as a Boolean value that indicates whether the object passed or failed the spoof detection test, or an integer, float, or other value that indicates the similarity of the object to a real finger based on the tested property.

At blocks 1461-1473, the fingerprint sensing system 100 makes a final determination of whether the object on the fingerprint sensor 130 is a spoof or a real finger based on the previously measured physical and electrical properties. According to this process, the image data for the surface pattern of the object is transmitted to the host if the object is distinguished as a real finger based on the measured properties.

At block 1461, the spoof detection logic 208 calculates an authenticity score based on weighted and summed factor scores each corresponding to one of the set of physical and electrical properties. In particular, the authenticity score is calculated by multiplying each factor score with an associated weight, then adding the resulting products. In one embodiment, the weight values are selected to allow the system to more accurately detect certain types of spoof materials, or may be calibrated to a pass a particular user's finger characteristics.

At block 1463, the spoof detection logic 208 determines whether the authenticity score exceeds a predetermined threshold. If the authenticity score does not exceed the threshold, the object is rejected as a spoof at block 1465. In one embodiment, the spoof attempt is reported to the host device 110.

At block 1463, if the authenticity score does exceed the predetermined threshold, the object at the fingerprint sensor 130 is distinguished as a real finger. Accordingly, the fingerprint sensor controller 120 encrypts and transmits an image of the surface pattern of the object to the host device 110 via SPI 111 to initiate the process for authenticating a user on the host device 110, according to block 1467.

At block 1469, the host device 110 receives and decrypts the surface pattern data and attempts to match the surface pattern to user fingerprint data in a database. If the surface pattern of the object does not match the fingerprint data for any user, the fingerprint is rejected at block 1471 and no user is authenticated. If the host device 110 successfully matches the surface pattern to fingerprint data for a user, the user is authenticated on the host at block 1473. In response to a successful user authentication, the host device 110 grants access to a resource of the host 110; for example, the host device 110 may grant the user access to a user interface or access to a filesystem.

Figure 15:
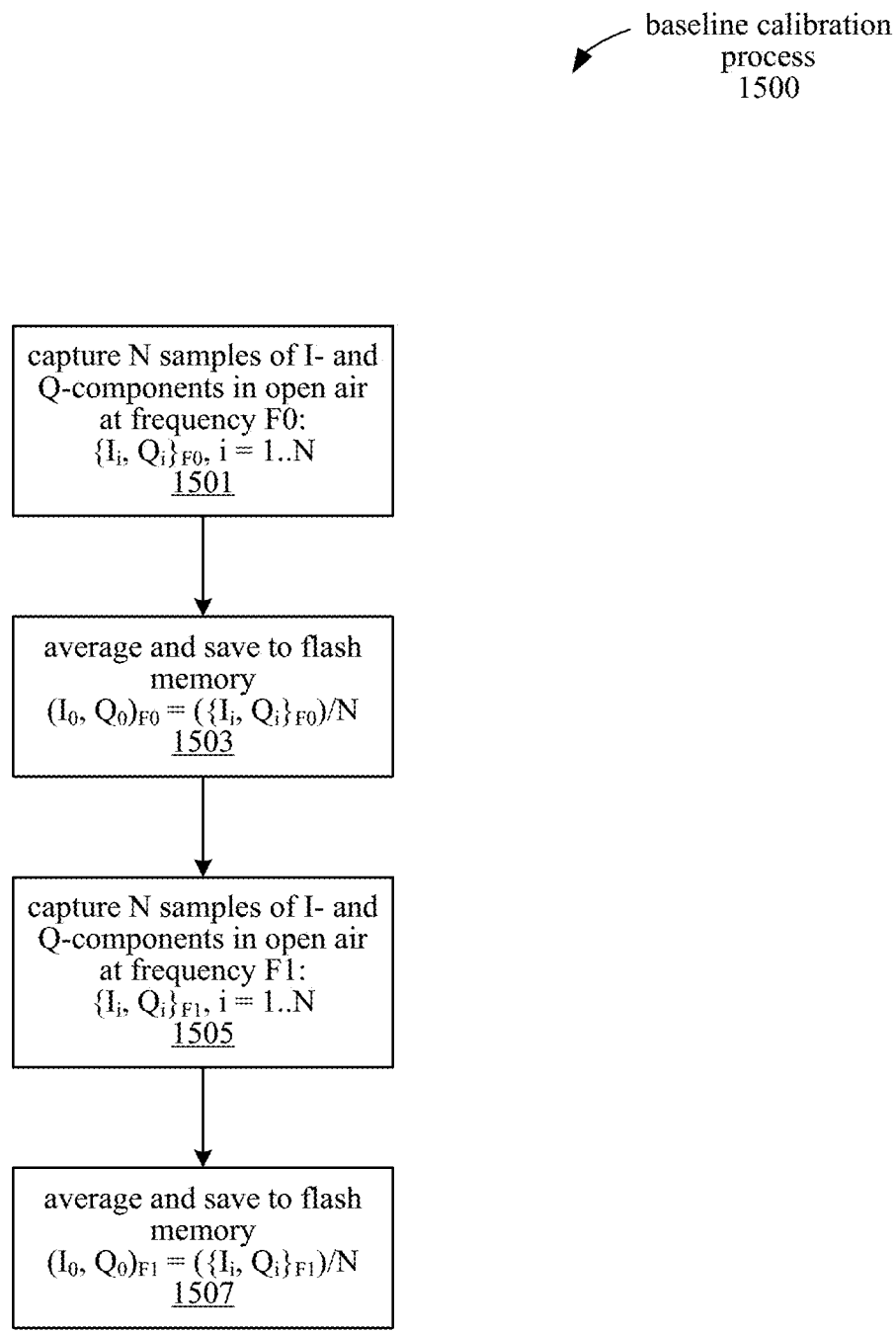
FIG. 15 illustrates a process for calibrating a baseline for an impedance sensing circuit, according to an embodiment.

FIG. 15 is a flow diagram illustrating a process 1500 for performing baseline calibration of an impedance sensing circuit, such as circuit 1200 illustrated in FIG. 12. In one embodiment, the baseline calibration process 1500 is performed during the sensor calibration of block 1401 in process 1400.

The calibration process 1500 establishes a baseline for the impedance sensing circuit 1200 by applying the TX-P and TX-N signals to the electrode sets 1110 and 1120, respectively, in similar fashion as described with reference to blocks 1445-1451. At block 1501, N samples of the resulting I and Q component values are captured, where N is a configurable integer value.

At block 1503, the I and Q values for all of the N samples are averaged and stored in flash memory. At block 1505, a similar process is performed as for block 1501, but with a different frequency F1 for the TX-P and TX-N signals. At block 1507, the I and Q values for the N samples at frequency F1 are averaged and stored in flash memory in similar fashion as for block 1503. The stored I and Q values are recalled and used to compensate I and Q values that are measured when an object is present at the fingerprint sensor 1100, such as the I and Q values that are generated at block 1447 of process 1400.

Figure 16:
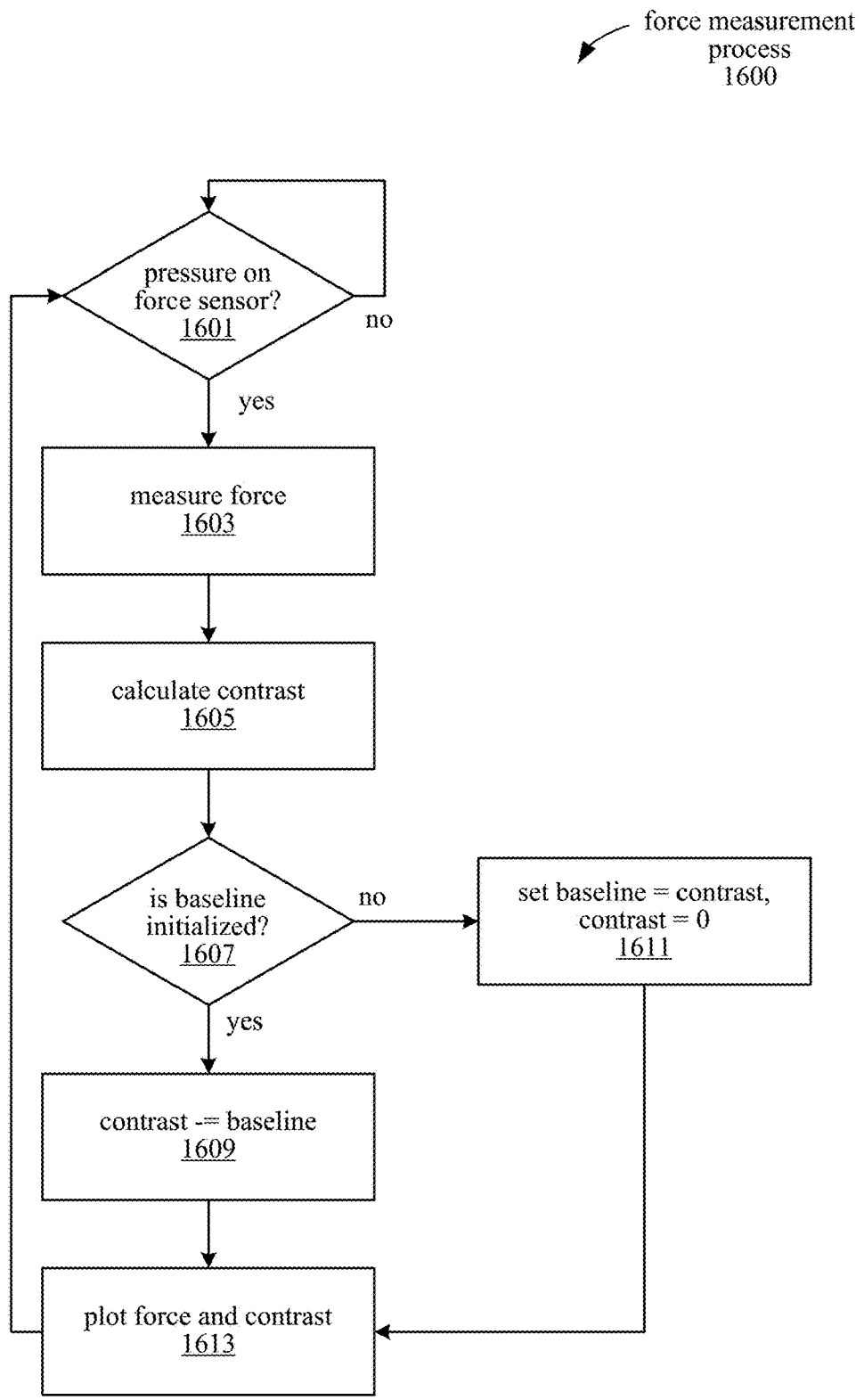
FIG. 16 illustrates a force measurement process, according to an embodiment.

FIG. 16 illustrates a process 1600 for measuring applied force using a force sensor. In one embodiment, the force measurement process 1600 corresponds to operations performed in accord with block 1431 in process 1400. In one embodiment, the process 1600 is performed by a fingerprint sensor controller 120 connected to a sensor module 810.

The force measurement process 1600 begins at block 1601. At block 1601, the force sensor scan module 207 scans the force sensor 815 and waits until pressure is detected on the force sensor 815. When pressure is detected on the force sensor 815, the force is measured at block 1603. At block 1605, the contrast for an image of the surface pattern of the object is calculated.

At block 1607, if the baseline for the force sensor has not yet been initialized, the baseline is set at block 1611 to the calculated contrast value from block 1605. The contrast is set to zero. The baseline thus represents the initial contrast value for the object that will be used to adjust subsequently measured contrast values. In one embodiment, the baseline contrast value is used to compensate for contrast variations between different fingers; thus, contrast changes resulting from changes in the applied force are calculated relative to the baseline for the finger.

At block 1607, if the baseline has already been initialized, the baseline is subtracted from the contrast value, and the contrast value is set equal to this difference. From blocks 1611 and 1609, the process 1600 continues at block 1613. At block 1613, the force and contrast values are plotted to reveal the relationship between the force and contrast.

Figure 17A:
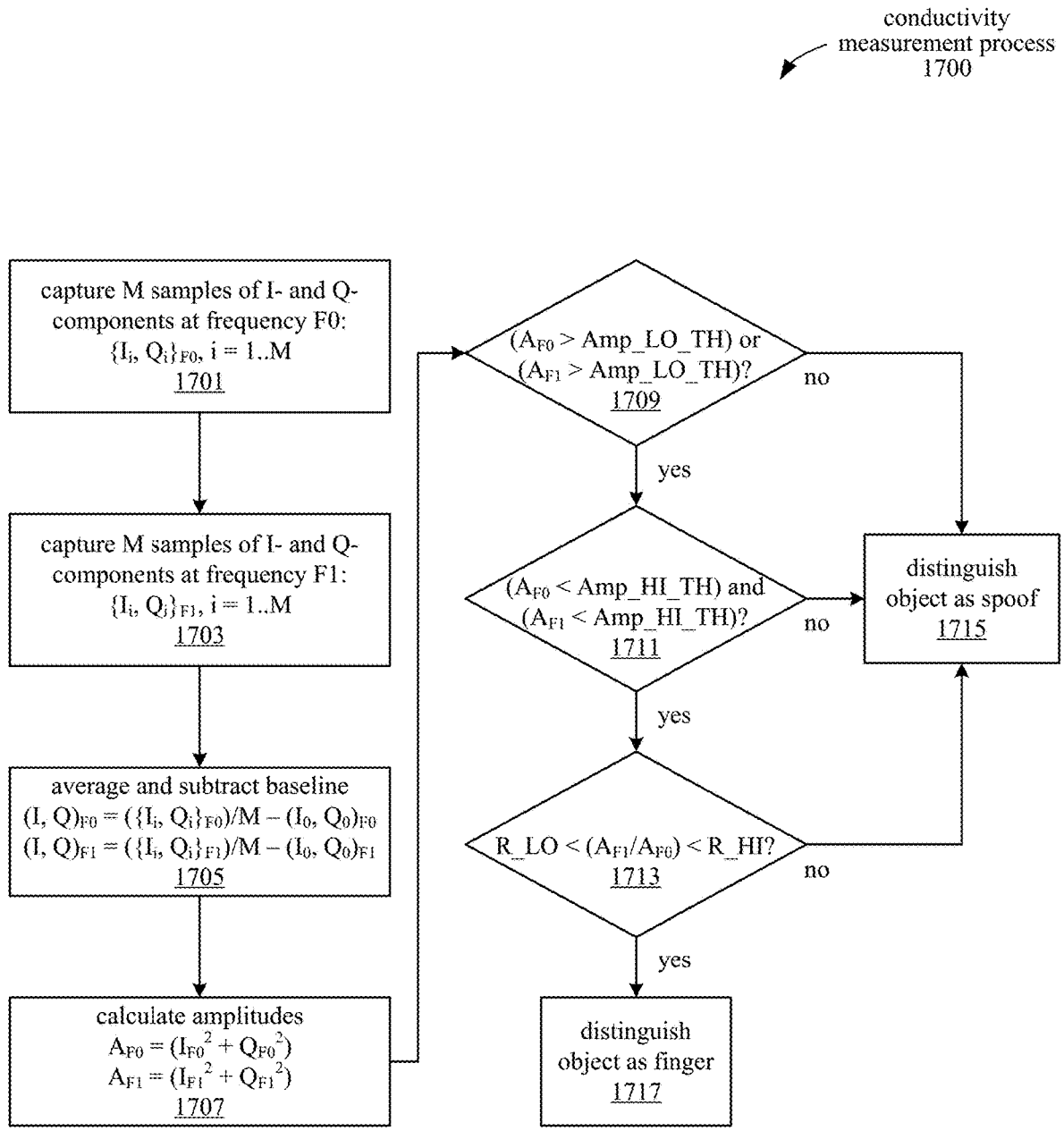
FIGS. 17A and 17B illustrate processes for measuring complex conductivity of an object, according to an embodiment.

FIG. 17 is a flow diagram illustrating a process 1700 for measuring the conductivity of an object at a fingerprint sensor using an impedance sensing circuit, such as circuit 1200 illustrated in FIG. 12. In one embodiment, the conductivity measurement process 1700 corresponds to the operations of blocks 1445-1451 in process 1400.

According to the conductivity measurement process 1700, the impedance sensing circuit 1200 measures the conductivity of the object by, at block 1701, capturing M samples of I and Q components resulting from the quadrature demodulation of the RX signal that is generated by applying the TX-P and TX-N signals to the electrode sets 1110 and 1120, respectively, at an initial frequency F0. At block 1703, the impedance sensing circuit 1200 captures M samples of I and Q components in a similar fashion as for block 1701 but for a different frequency F1. M is a configurable integer value.

At block 1705, the M values of I and Q for frequency F0 are averaged and the M values of I and Q for frequency F1 are averaged. The baseline I and Q component values for frequency F0 are then subtracted from the average I and Q values for frequency F0, and the baseline I and Q component values for frequency F1 are subtracted from the average I and Q values for frequency F1.

At block 1707, the spoof detection logic 208 calculates the amplitudes $A_{F0}$ and $A_{F1}$ for frequencies F0 and F1 based on the baseline compensated I and Q values from block 1705. The amplitude $A_{F0}$ corresponding to frequency F0 is set equal to $(I_{F0}^2+Q_{F0}^2)$, where $I_{F0}$ and $Q_{F0}$ are the I and Q component values, respectively, for frequency F0. Similarly, the amplitude $A_{F1}$ corresponding to frequency F1 is set equal to $(I_{F1}^2+Q_{F1}^2)$, where $I_{F1}$ and $Q_{F1}$ are the I and Q component values, respectively, for frequency F0.

At block 1709-1717, the spoof detection logic 208 distinguishes the object as a spoof or a finger based on whether any of the amplitudes $A_{F0}$ and $A_{F1}$ are outside an acceptable range of amplitudes expected for a finger, and based on whether a ratio $A_{F1}/A_{F0}$ is outside an acceptable range for amplitude ratios expected for a finger.

From block 1709, the spoof detection logic 208 rejects the object as a spoof at block 1715 if none of amplitudes $A_{F0}$, $A_{F1}$ are higher than a low threshold amplitude Amp_LO_TH. This rejects spoofs having high and low conductivity, such as silicone, silicone mixed with metal powder, silicone with carbon threads, latex paint, wood glue or PVA, FPC with isolated/exposed etched copper, etc. In one embodiment, Amp_LO_TH is an empirical programmable threshold.

From block 1711, the spoof detection logic 208 rejects the object as a spoof at block 1715 if any of amplitudes $A_{F0}$, $A_{F1}$ is higher than a high threshold amplitude Amp_HI_TH. This rejects spoofs covered with graphite film. In this case graphite covered ridges can be considered as a conductive islands which cause high signal coupling to the RX listener electrode 1101 from the near TX electrode set 1110 but low coupling from the far TX electrode set 1120. In one embodiment, Amp_HI_TH is an empirical programmable threshold.

From block 1713, the spoof detection logic 208 rejects the object as a spoof at block 1715 if the ratio of amplitudes $A_{F1}/A_{F0}$ is not greater than a low ratio threshold R_LO and less than a high ratio threshold R_HI. This condition rejects spoofs with medium conductivity, such as wood glue or PVA mixed with glycerin, conductive rubber with a laser cut pattern, Play-Doh™ mixed with glycerin, etc. In one embodiment, R_LO and R_HI are empirical programmable thresholds. In one embodiment, an impedance sensing circuit 1200 with equal gain at F0 and F1 has a threshold R_LO equal to 1.8 and a threshold R_HI equal to 5. If each of the conditions tested at blocks 1709, 1711, and 1713 are evaluated to be true, the object is distinguished as an actual finger at block 1717.

Figure 17B:
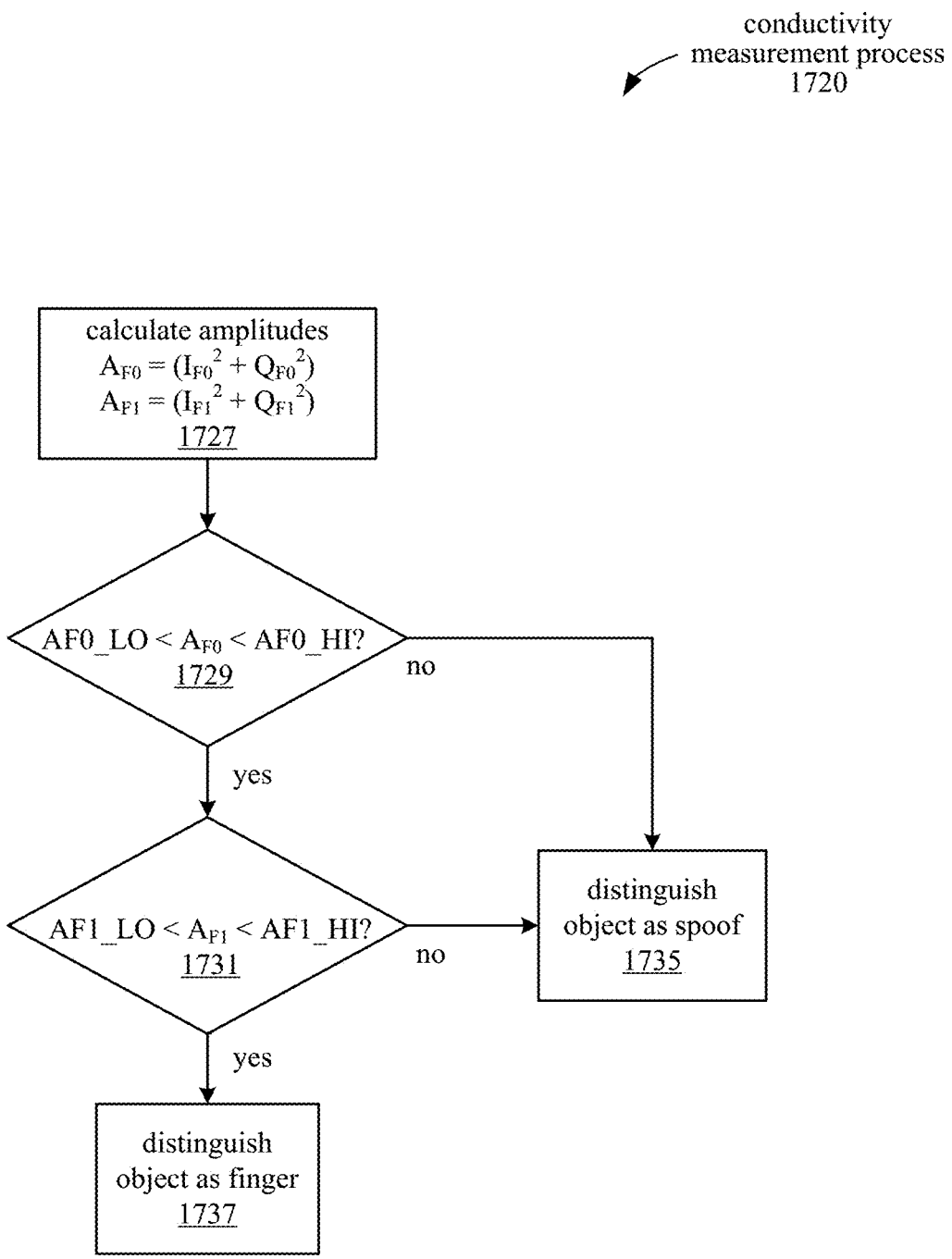

FIG. 17B is a flow diagram illustrating a simplified conductivity measurement process 1720 that can be used in place of or in conjunction with conductivity measurement process 1700. In process 1720, the amplitudes for each of the frequencies F0 and F1 are calculated from the I and Q component values at block 1727, in similar fashion as block 1707 in process 1700.

At blocks 1729 and 1731, the amplitudes $A_{F0}$ and $A_{F1}$ are each compared with individual high and low thresholds. From block 1729, the object is distinguished as a spoof at block 1735 if the amplitude $A_{F0}$ is not between $A_{F0}$_LO and $A_{F0}$_HI. Similarly, from block 1731, the object is distinguished as a spoof at block 1735 if the amplitude $A_{F1}$ is not between $A_{F1}\_LO$ and $A_{F1}\_HI$. If each of the conditions tested at blocks 1729 and 1731 are evaluated to be true, the object is distinguished as an actual finger at block 1737.

In the foregoing embodiments, various modifications can be made; for example, row sensor electrodes and column sensor electrodes may be interchanged, and row or column sensor electrodes may be used as either Tx or Rx sensor electrodes. Furthermore, in some embodiments, intersections between row and column sensor electrodes may be replaced with conductive bridges. For example, bridges may be used to electrically connect portions of sensor electrodes when both row and column sensor electrodes are constructed from a single layer of conductive material. As described herein, conductive electrodes that are "electrically connected" or "electrically coupled" may be coupled such that a relatively low resistance conductive path exists between the conductive electrodes. Quantities or dimensions described as "substantially" equal may be nominally equal but need not be exactly equal (with variations due to manufacturing tolerances, environmental conditions, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In some embodiments, a microprocessor, microcontroller, or other hardware-based processor may perform some or all of the operations of the method(s) herein by executing instructions stored in firmware, flash memory, or other storage medium accessible to a fingerprint sensor controller and/or a host device.

In the foregoing specification, the claimed subject matter has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   detecting a presence of an object at a fingerprint sensor;
   in response to detecting the presence of the object, performing steps comprising:
   capturing an image of a surface pattern of the object using a set of electrodes; and
   measuring a set of physical properties of the object based on one or more signals from the set of electrodes of the fingerprint sensor, wherein the set of physical properties includes a subsurface elasticity of the object, wherein the subsurface elasticity is an elasticity of material under a surface layer of the object, wherein the subsurface elasticity of the object is measured by comparing at least two intensity values to each other, wherein the intensity values are determined from the one or more signals and at least one of the intensity values is affected by proximity of a raised edge adjacent to the fingerprint sensor, wherein the fingerprint sensor is surrounded by the raised edge, wherein the raised edge is raised relative to a sensing surface of the fingerprint sensor, wherein measuring the subsurface elasticity comprises comparing two or more portions of the image of the surface pattern of the object with each other, and wherein the two or more portions of the image are captured from a first area of the fingerprint sensor and one or more second areas of the fingerprint sensor that are each closer to the raised edge than the first area of the fingerprint sensor; and
   distinguishing the object as an actual finger or a spoof based on the set of physical properties.

2. The method of claim 1, wherein the distinguishing further comprises:
   calculating an authenticity score based on a sum of weighted factors each corresponding to one of the set of physical properties; and
   distinguishing the object as an actual finger in response to the authenticity score exceeding a predetermined threshold.

3. The method of claim 1, further comprising:
   capturing an image of a surface pattern of the object using the set of electrodes; and
   initiating authentication of a user in response to determining that the surface pattern matches fingerprint data associated with the user and in response to distinguishing the object as an actual finger.

4. The method of claim 3, wherein capturing the image of the surface pattern of the object is performed within a preset time limit after detecting the presence of the object on the fingerprint sensor.

5. The method of claim 1, further comprising:
   determining the intensity values by, for each portion of the two or more portions of the image, calculating one of the intensity values for the portion based on intensities of all pixels in the portion; and distinguishing the object as a spoof based on determining that the calculated intensity value of any of the two or more portions differs by at least a threshold amount from a calculated intensity value of any other portion of the two or more portions.

6. The method of claim 1, further comprising:
supporting the fingerprint sensor on a mechanical button; and
measuring the subsurface elasticity of the object by:
prior to activation of the button, capturing from the fingerprint sensor a first image of a surface of the object in response to detecting the presence of the object on the fingerprint sensor; and
capturing from the fingerprint sensor a second image of the surface of the object while the button is activated, wherein the distinguishing is based on comparing the first image of the surface of the object with the second image of the surface of the object.

7. The method of claim 1, further comprising measuring a surface adhesiveness of the object by:
measuring a first force applied by the object to the fingerprint sensor while capturing a first image of a surface pattern of the object; and
measuring a second force applied by the object to the fingerprint sensor while capturing a second image of a surface pattern of the object, wherein the second force is measured after the first force, wherein the second force is less than the first force, and wherein the distinguishing is based on a difference in contrast between the first image and second image.

8. The method of claim 1, further comprising measuring an electrical conductivity of the object by:
determining a first amplitude of a first receive (RX) signal generated at an RX electrode in response to a first transmit (TX) signal at a first frequency applied to a first set of electrodes of the fingerprint sensor while an antiphase version of the first TX signal is applied to a second set of electrodes of the fingerprint sensor;
determining a second amplitude of a second receive (RX) signal generated at the RX electrode in response to a second TX signal at a second frequency applied to the first set of electrodes of the fingerprint sensor while an antiphase version of the second TX signal is applied to the second set of electrodes of the fingerprint sensor; and
distinguishing the object as a spoof based on at least one of determining that at least one of the first amplitude and the second amplitude is outside a first acceptable range and determining that a ratio of the first amplitude and the second amplitude is outside a second acceptable range.

9. A fingerprint sensing circuit, comprising:
a hardware scan engine coupled with a set of electrodes of a fingerprint sensor, wherein the hardware scan engine is configured to sense a surface pattern of an object at the fingerprint sensor; and
a spoof detection logic module coupled with the hardware scan engine and configured to, in response to detecting a presence of the object at the fingerprint sensor:
capture an image of a surface pattern of the object using the set of electrodes;
measure a set of physical properties of the object based on one or more signals from the set of electrodes, wherein the set of physical properties includes a subsurface elasticity of the object, wherein the subsurface elasticity is an elasticity of material under a surface layer of the object, wherein the subsurface elasticity of the object is measured by comparing at least two intensity values to each other, wherein the intensity values are determined from the one or more signals and at least one of the intensity values is affected by proximity of a raised edge adjacent to the fingerprint sensor, wherein the fingerprint sensor is surrounded by the raised edge, wherein the raised edge is raised relative to a sensing surface of the fingerprint sensor, wherein measuring the subsurface elasticity comprises comparing two or more portions of the image of the surface pattern of the object with each other, and wherein the two or more portions of the image are captured from a first area of the fingerprint sensor and one or more second areas of the fingerprint sensor that are each closer to the raised edge than the first area of the fingerprint sensor, and
distinguish the object as an actual finger or a spoof based on the set of physical properties.

10. The fingerprint sensing circuit of claim 9, wherein the spoof detection logic module is further configured to:
calculate an authenticity score based on a sum of weighted factors each corresponding to one of the set of physical properties; and
distinguish the object as an actual finger in response to the authenticity score exceeding a predetermined threshold.

11. The fingerprint sensing circuit of claim 9, wherein:
the raised edge is raised by at least 0.2 millimeters above the sensing surface of the fingerprint sensor, and
the spoof detection logic module is further configured to:
distinguish the object as a spoof based on determining that one of the intensity values determined for any of the two or more portions differs by at least a threshold amount from another one of the intensity values determined for any other portion of the two or more portions.

12. The fingerprint sensing circuit of claim 9, further comprising:
a mechanical button, wherein the fingerprint sensor is positioned on top of the mechanical button, and wherein the mechanical button is configured to activate in response to an activation force applied to the fingerprint sensor, wherein the spoof detection logic module is further configured to measure the subsurface elasticity of the object by:
prior to activation of the button, capturing from the fingerprint sensor a first image of a surface of the object in response to detecting a presence of the object on the fingerprint sensor,
capturing from the fingerprint sensor a second image of the surface of the object while the button is activated, and
distinguish the object as an actual finger or a spoof based on comparing the first image of the surface of the object with the second image of the surface of the object.

13. The fingerprint sensing circuit of claim 9, further comprising a force sensor coupled with the spoof detection logic module, wherein the force sensor is configured to:
measure a first force applied by the object to the fingerprint sensor during capturing of a first image of a surface pattern of the object; and
after measuring the first force, measure a second force applied by the object to the fingerprint sensor during capturing of a second image of a surface pattern of the object, wherein the second force is less than the first force, and wherein the spoof detection logic module is further configured to distinguish the object as an actual finger or a spoof based on a difference in contrast between the first image and second image.

14. The fingerprint sensing circuit of claim 9, wherein the set of electrodes of the fingerprint sensor further comprises:
a receive (RX) electrode;
a first set of transmit (TX) electrodes coupled with the RX electrode via a first signal path; and
a second set of TX electrodes coupled with the RX electrode via a second signal path having a different length than the first signal path, wherein the hardware scan engine is configured to, while the object is present at the fingerprint sensor:
generate a first RX signal by applying a first TX signal at a first frequency to the first set of TX electrodes while applying an antiphase version of the first TX signal to the second set of TX electrodes, and
generate a second RX signal by applying a second TX signal at a second frequency to the first set of TX electrodes while applying an antiphase version of the second TX signal to the second set of TX electrodes, wherein the spoof detection logic module is further configured to measure an electrical conductivity of the object by:
determining a first amplitude of the first RX signal,
determining a second amplitude of the second RX signal, and
distinguishing the object as a spoof based on at least one of determining that at least one of the first amplitude and the second amplitude is outside a first acceptable range and determining that a ratio of the first amplitude and the second amplitude is outside a second acceptable range.

15. A fingerprint sensing system, comprising:
a fingerprint sensor;
a fingerprint sensor controller coupled with the fingerprint sensor and configured to:
sense a surface pattern of an object at the fingerprint sensor;
detect a presence of the object at the fingerprint sensor,
in response to detecting the presence of the object, measure a set of physical properties of the object based on one or more signals from a set of electrodes of the fingerprint sensor, wherein the set of physical properties includes a subsurface elasticity of the object, wherein the subsurface elasticity is an elasticity of material under a surface layer of the object, wherein the subsurface elasticity of the object is measured by comparing at least two intensity values with each other, wherein the intensity values are determined from the one or more signals and at least one of the intensity values is affected by proximity of a raised edge adjacent to the fingerprint sensor, wherein the fingerprint sensor is surrounded by the raised edge, wherein the raised edge is raised relative to a sensing surface of the fingerprint sensor, and wherein measuring the subsurface elasticity comprises comparing two or more portions of the image of the surface pattern of the object with each other, wherein the two or more portions of the image are captured from a first area of the fingerprint sensor and one or more second areas of the fingerprint sensor that are each closer to the raised edge than the first area of the fingerprint sensor, and generate a spoof detection result by distinguishing the object as an actual finger or a spoof based on the set of physical properties; and
a host device coupled with the fingerprint sensor and configured to grant access to a resource based on the spoof detection result.

16. The fingerprint sensing system of claim 15, wherein the host device is further configured to:
receive an image of the surface pattern from the fingerprint sensor controller;
match the surface pattern with fingerprint data associated with a user; and
authenticate the user based on matching the surface pattern with the fingerprint data and based on the spoof detection result.

17. The fingerprint sensing system of claim 15, further comprising a force sensor coupled with the fingerprint sensor controller, wherein the force sensor is configured to:
measure a first force applied by the object to the fingerprint sensor during capturing of a first image of a surface pattern of the object; and
after measuring the first force, measure a second force applied by the object to the fingerprint sensor during capturing of a second image of a surface pattern of the object, wherein the second force is less than the first force, and wherein the fingerprint sensor controller is further configured to distinguish the object as an actual finger or a spoof based on a difference in contrast between the first image and second image.

18. The fingerprint sensing system of claim 15, wherein the set of electrodes of the fingerprint sensor further comprises:
a receive (RX) electrode;
a first set of transmit (TX) electrodes coupled with the RX electrode via a first signal path; and
a second set of TX electrodes coupled with the RX electrode via a second signal path having a different length than the first signal path, wherein the hardware scan engine is configured to, while the object is present at the fingerprint sensor:
generate a first RX signal by applying a first TX signal at a first frequency to the first set of TX electrodes while applying an antiphase version of the first TX signal to the second set of TX electrodes, and
generate a second RX signal by applying a second TX signal at a second frequency to the first set of TX electrodes while applying an antiphase version of the second TX signal to the second set of TX electrodes, wherein the fingerprint sensor controller is further configured to measure an electrical conductivity of the object by:
determining a first amplitude of the first RX signal,
determining a second amplitude of the second RX signal, and
distinguishing the object as a spoof based on at least one of determining that at least one of the first amplitude and the second amplitude is outside a first acceptable range and determining that a ratio of the first amplitude and the second amplitude is outside a second acceptable range.

* * * * *